(12) United States Patent
Weber et al.

(10) Patent No.: US 6,185,620 B1
(45) Date of Patent: Feb. 6, 2001

(54) SINGLE CHIP PROTOCOL ENGINE AND DATA FORMATTER APPARATUS FOR OFF CHIP HOST MEMORY TO LOCAL MEMORY TRANSFER AND CONVERSION

(75) Inventors: David M. Weber, Monument; Timothy E. Hoglund, Colorado Springs; Stephen M. Johnson, Colorado Springs; John M. Adams, Colorado Springs, all of CO (US); Mark A. Reber, Alpharetta, GA (US)

(73) Assignee: LSI Logic Corporation

( * ) Notice: Under 35 U.S.C. 154(b), the term of this patent shall be extended for 0 days.

(21) Appl. No.: 09/054,849

(22) Filed: Apr. 3, 1998

(51) Int. Cl.[7] ............... G06F 11/00; G06F 9/46; H04Q 11/04

(52) U.S. Cl. ............ 709/230; 709/232; 709/231; 709/251; 710/105; 710/106; 710/11

(58) Field of Search .................... 709/232, 231, 709/230, 250, 251; 710/105, 11, 106; 714/4, 49; 370/222, 216

(56) References Cited

U.S. PATENT DOCUMENTS

| | | | |
|---|---|---|---|
| 5,519,695 | * 5/1996 | Purohit et al. | 370/352 |
| 5,598,541 | * 1/1997 | Malladi | 709/250 |
| 5,610,745 | * 3/1997 | Bennett | 370/232 |
| 5,623,494 | * 4/1997 | Rostoker et al. | 370/397 |
| 5,625,563 | * 4/1997 | Rostoker et al. | 340/825.5 |
| 5,638,518 | 6/1997 | Malladi | 395/200.21 |
| 5,832,279 | * 11/1998 | Rostoker et al. | 710/266 |
| 5,944,798 | * 8/1999 | McCarty et al. | 709/251 |

* cited by examiner

*Primary Examiner*—Ahmad F. Matar
*Assistant Examiner*—William D. Thompson

(57) ABSTRACT

A method and apparatus for transferring data from a host to a node through a fabric connecting the host to the node. A chip architecture is provided in which a protocol engine provides for on ship processing in transferring data such that frequent interrupts from various components within the chip may be processed without intervention from the host processor. Additionally, context managers are provided to transmit and receive data. The protocol engine creates a list of transmit activities, which is traversed by the context managers, which in turn execute the listed activity in a fashion independent from the protocol engine. In receiving data, the context managers provide a mechanism to process frames of data originating from various sources without requiring intervention from the protocol engine. When receiving data, the context managers are able to process frames from different sources, which arrive out of order. Additionally, the context managers also determine when all frames within a sequence have been received. A link control unit is provided in which loop management is provided when the host is connected to a loop. Management of the loop includes implementing mechanisms to initiate acquisition of the loop and initiate a release of the loop in response to conditions in which data is received and transmitted by the host and by other nodes on the loop.

18 Claims, 13 Drawing Sheets

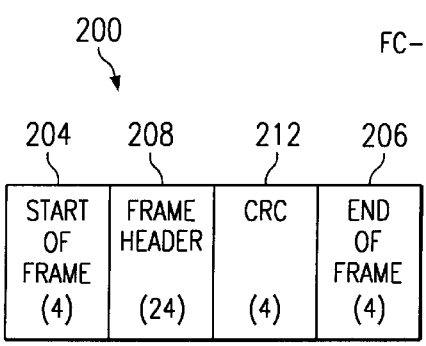
FIG. 1
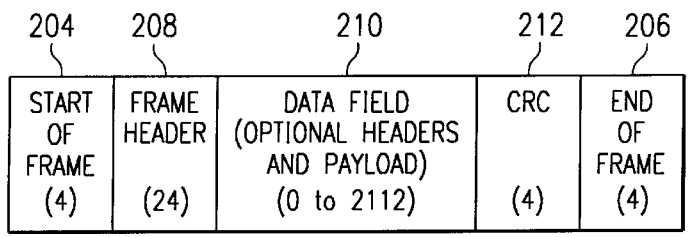
FIG. 2A
FIG. 2B
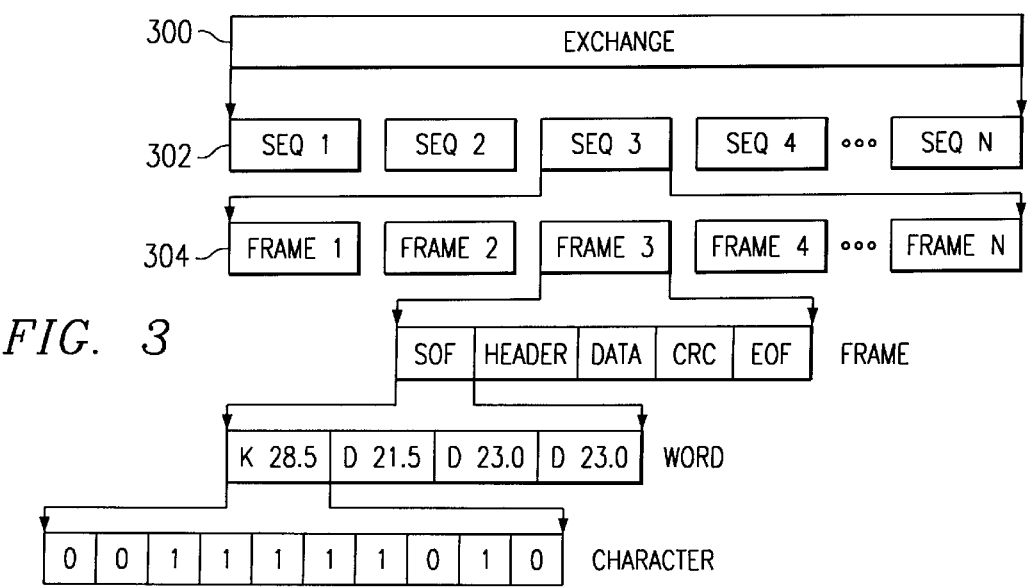
FIG. 3

| OFFSET | | RCB FIELD | | |
|---|---|---|---|---|
| BYTE | WORD | | | |
| 0 | 0 | R_CTL | D_ID | |
| 4 | 1 | RESERVED | S_ID | 1202 |
| 8 | 2 | TYPE | F_CTL | |
| C | 3 | SEQ_ID | DF_CTL | SEQ_CNT |
| 10 | 4 | OX_ID | RX_ID | |
| 14 | 5 | HIGHEST SEQUENCE COUNT | LOWEST SEQUENCE COUNT | |
| 18 | 6 | FRAME COUNT | LAST SEQUENCE COUNT | 1204 |
| 1C | 7 | SEQUENCE BYTE COUNT | | |
| 20 | 8 | CONTEXT STATUS | | |
| 24 | 9 | BASE S/G POINTER | | |
| 28 | A | PSEUDO FRAME RELATIVE OFFSET | | 1206 |
| 2C | B | CURRENT S/G POINTER | | |
| 30 | C | CURRENT RELATIVE OFFSET | | |
| 34 | D | TIME STAMP | | 1208 |

EMF = Empty Message Frame
FMF = Full Message frame
--- = Data moving from system memory to local memory or vice-versa
OSM = Operating System Module
IOP = I/O Platform
TCB = Transmit Context Block
RCB = Receive Context Block
SG = Scatter/Gather
REQ MSG = Request Message Frame
RPY MSG = Reply Message Frame
GLM = Gigabaud Link Module

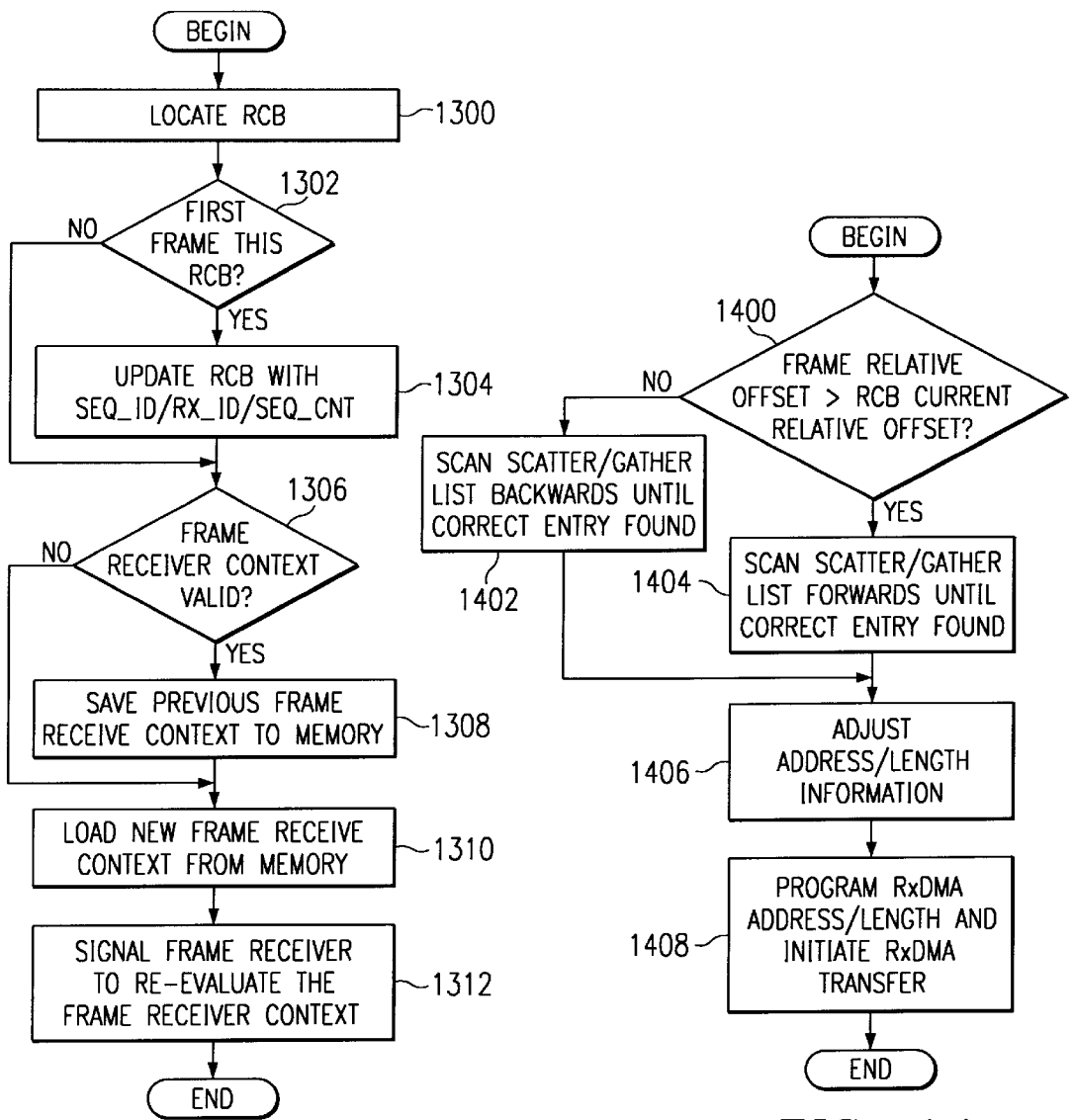
FIG. 13
FIG. 14
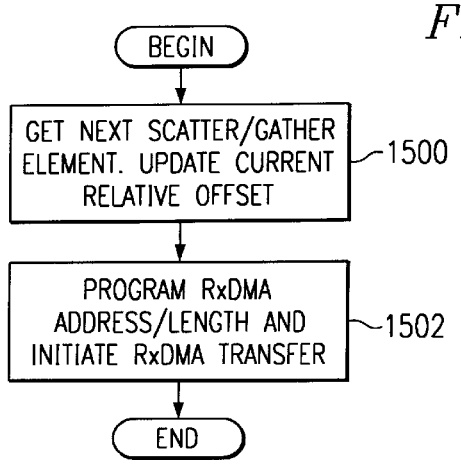
FIG. 15

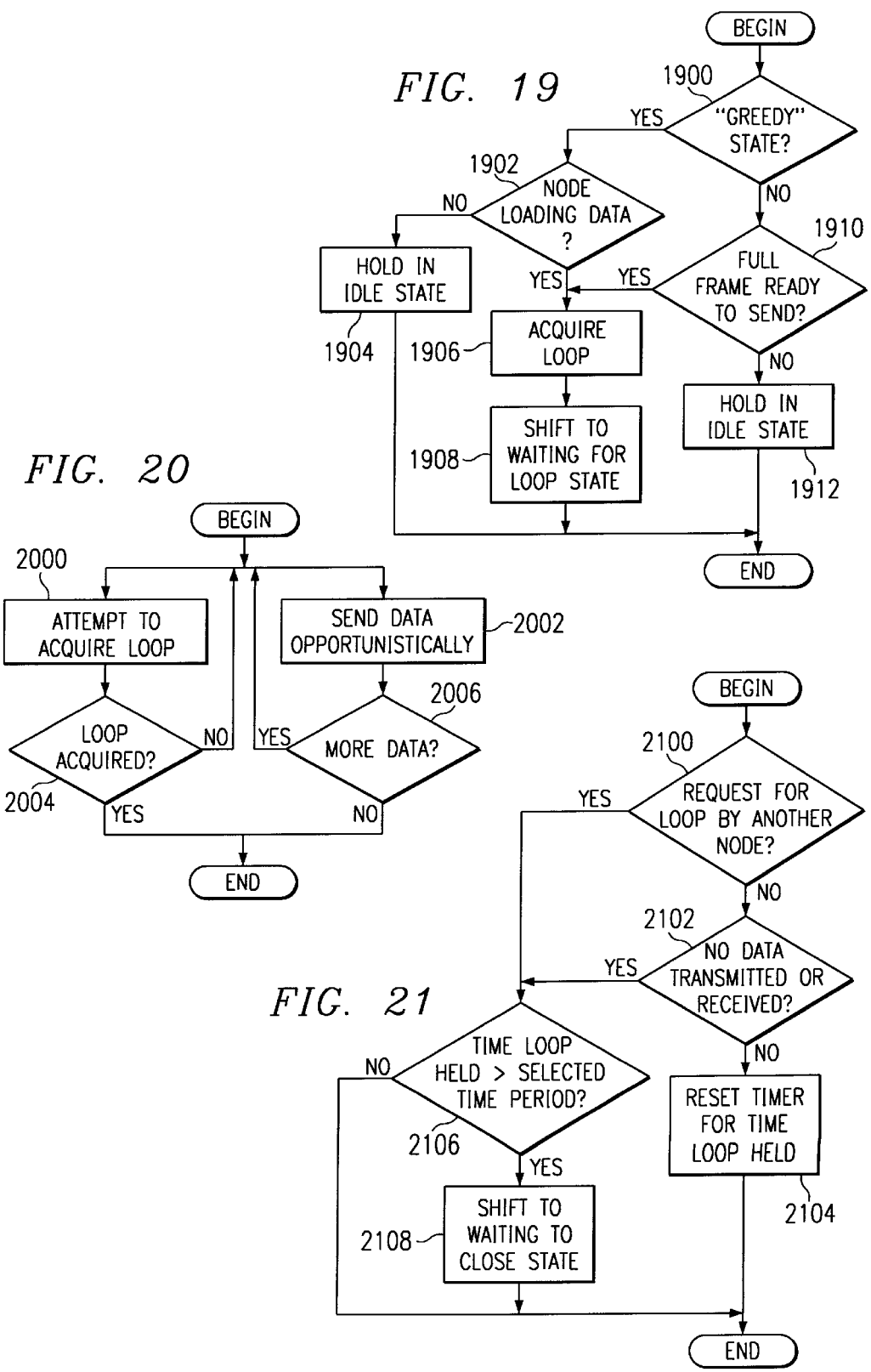

SINGLE CHIP PROTOCOL ENGINE AND DATA FORMATTER APPARATUS FOR OFF CHIP HOST MEMORY TO LOCAL MEMORY TRANSFER AND CONVERSION

CROSS REFERENCE TO RELATED APPLICATION

This application is related to copending and commonly assigned applications entitled "METHOD AND APPARATUS FOR MANAGING ACCESS TO A LOOP IN A DATA PROCESSING SYSTEM", application Ser. No. 09/054,850, filed on Apr. 3, 1998 incorporated by reference herein.

BACKGROUND OF THE INVENTION

1. Technical Field

The present invention relates generally to an improved data processing system and in particular to an improved method and apparatus for transferring data from one data protocol to another data protocol. Still more particularly, the present invention provides an improved method and apparatus for transferring data from a channel protocol to a serial protocol, such as a Fibre channel.

2. Description of the Related Art

The Fibre Channel Standard (FCS) as adopted by ANSI provides a low cost, high speed interconnect standard for workstations, mass storage devices, printers, and displays. The Fibre Channel (FC) is ideal for distributed system architectures and image intensive local area networks and clusters. Fibre Channel is media independent and provides multi-vendor interoperability.

Current Fibre Channel data transfer rates exceeds 100 Mbytes per second in each direction. Fibre Channel data transfer rates also may be scaled to lower speed, such as 50 Mbytes per second and 25 Mbytes per second. This technology provides an interface that supports both channel and network connections for both switched and shared mediums. Fibre Channel simplifies device interconnections and reduces hardware cost because each device requires only a single Fibre Channel port for both channel and network interfaces. Network, port to port, and peripheral interfaces can be accessed though the same hardware connection with the transfer of data of any format.

In transferring data between targets and sources, the rapid increase in the performance of input/output (I/O) processor technology has caused a tremendous demand in high-performance server, workstation, clustered computing, and related storage markets for I/O solutions that are higher speed, offer more connectivity, and can connect over greater distances. Fibre Channel I/O processors that are high-performance, intelligent I/O processors designed to support mass storage and other protocols on a full-duplex Fibre Channel link are desired to move data in a manner that reduces the host CPU and PCI bandwidth required to support I/O operations. It is desirable to minimize the amount of time spent on a system bus, such as the PCI bus, for non-data-moving activities such as initialization, command and error recovery. Therefore, it would be advantageous to have an improved method and apparatus for transferring data between two different data protocols.

SUMMARY OF THE INVENTION

The present invention provides a method and apparatus for transferring data from a host to a first node through a bus connecting the host to the first node and subsequently to a second node connected to the first node through a fabric. The first node includes a chip architecture in which a protocol engine provides for on chip processing in transferring data such that frequent interrupts from various components within the chip may be processed without intervention from the host processor. Additionally, context managers are provided to transmit and receive data. The protocol engine creates a list of transmit activities, which is traversed by the context managers, which in turn execute the listed activity in a fashion independent from the protocol engine. In receiving data, the context managers provide a mechanism to process frames of data originating from various sources without requiring intervention from the protocol engine. When receiving data, the context managers are able to process frames from different sources, which arrive out of order. Additionally, the context managers also determine when all frames within a sequence have been received.

Additionally, the present invention provides a link control unit in which loop management is provided when the host is connected to a loop. Management of the loop includes implementing mechanisms to initiate acquisition of the loop and initiate a release of the loop in response to conditions in which data is received and transmitted by the host and by other nodes on the loop.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 illustrates the five layers in Fibre Channel in accordance with a preferred embodiment of the present invention;

FIGS. 2A and 2B is a link control frame and a data frame;

FIG. 3 is a diagram of an exchange and how it is broken down into its smallest elements;

FIG. 13 is a flowchart used to perform context switching in accordance with a preferred embodiment of the present invention;

FIG. 14 is a flowchart of a DMA start process in accordance with a preferred embodiment of the present invention;

FIG. 15 is a flowchart of a DMA update process in accordance with a preferred embodiment of the present invention;

FIG. 19 is a flowchart of a process incorporating rules used to in the idle state to control acquisition of the loop in accordance with a preferred embodiment of the present invention;

FIG. 20 is a flowchart of a process incorporating rules used in the Waiting for Loop State in accordance with a preferred embodiment of the present invention;

FIG. 21 is a flowchart of a process incorporating rules used in handling transitions in the Decision Window State in accordance with a preferred embodiment of the present invention.

DETAILED DESCRIPTION

Figure 4:
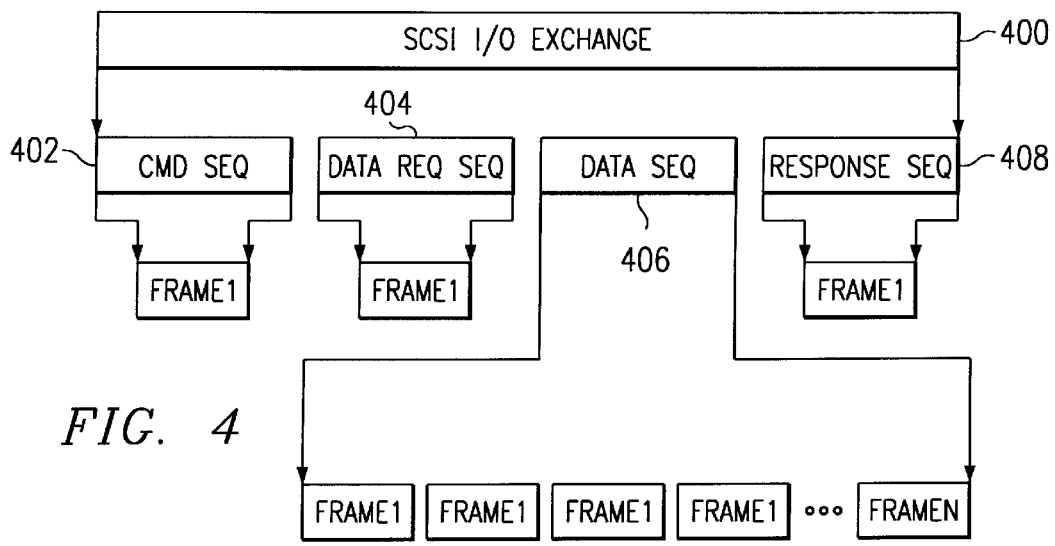
FIG. 4 illustrates a SCSI exchange that may be handled by a preferred embodiment of the present invention.

Fibre Channel is a high performance link providing support for networking protocols such as Internet Protocol (IP) and channel protocols such as Small Computer System Interface (SCSI). The structure of Fibre Channel is defined by five layers. FIG. 1 illustrates the five layers in Fibre Channel. The lowest layer, FC-0, is the media interface layer. It defines the physical interface between two devices. It includes drivers, receivers, copper-to-optical transducers, connectors and any other low level associated circuitry necessary to transmit or receive at 133, 266, 531, 1062 Mbit/s rates over copper or optical cable.

The next level up is the FC-1 layer. This layer defines the 8b/10b encoding/decoding, the transmission protocol necessary to integrate the data and transmit clock and receive clock recovery. This layer is usually divided between the hardware implementing the FC-0 layer and the FC-2 layer. Specifically, the FC-0 transceivers can include the clock recovery circuitry while the 8b/10b encoding/decoding is done in the FC-2 layer. The next layer up is the FC-2 layer. This layer defines the framing protocol and flow control operations on the data being transferred. The meaning of the data being transmitted or received is transparent to the FC-2 layer. However, the context between any given set of frames is maintained at the FC-2 layer. The framing protocol creates the necessary frames with the data being packetized within each frame's payload. The next layer up is the FC-3 layer. FC-3 provides common services that span multiple N_Ports. An N_port, also referred to as a "node" port, is a Fibre channel defined hardware entity at the node end of a link. Some of these services include Striping, Hunt Groups and Multicasting. All of these services allow a single Port to communicate to several N_Ports at one time. The top layer defined in FC is the FC-4 layer. The FC-4 layer provides a seamless integration of existing standards. It specifies the mapping of upper layer protocols (ULPs) to the layers below. Some of these ULPs include Small Computer System Interface (SCSI) and Internet Protocol (IP). Each of these ULPs are defined in its own ANSI document.

There are two types of frames used in Fibre Channel, the link control frames and the data frames. Link control frames contain no payload and are responses to data frames. Data frames are frames which contain data in the payload fields. With reference to FIGS. 2A and 2B, a link control frame 200 and a data frame 202 are illustrated. Each frame includes a start-of-frame (SOF) field 204 and ends with an end-of-frame (EOF) field 206 ordered set. All ordered sets, including SOF and EOF, consist of four bytes. Each frame contains at least a 24 byte header field 208 defining such things as destination and source ID, class of service and type of frame (i.e., SCSI or IP). The biggest field within a frame is the payload field 210 as found in data frame 202. If the frame is a link control frame then payload field 210 is absent, if it is a data frame then the frame will contain a payload field up to 2112 bytes. Finally, both types of frames include a Cyclic Redundancy Check (CRC) field 212 used for detection of transmission errors.

Other constructs used in Fibre Channel are the sequences and exchanges. With reference next to FIG. 3, a diagram of an exchange and how it is broken down into its smallest elements is shown. An exchange 300 includes one or more sequences, such as sequence 302. Each sequence is made up of one or more frames, such as frame 304. An exchange is best illustrated by considering a typical SCSI I/O. In a SCSI I/O, several phases are present, which make up the I/O. These phases include Command, Data, Message and Status phases.

Using the Fibre Channel Protocol for SCSI (FCP) ULP these phases can be mapped into the other lower FC layers. FIG. 4 illustrates a SCSI exchange that may be handled by a preferred embodiment of the present invention. SCSI exchange 400 includes command sequence, CMD SEQ 402, a data request sequence, DATA REQ SEQ 404, a data sequence, DATA SEQ 406, and a response sequence, RSP SEQ 408.

Figure 5:
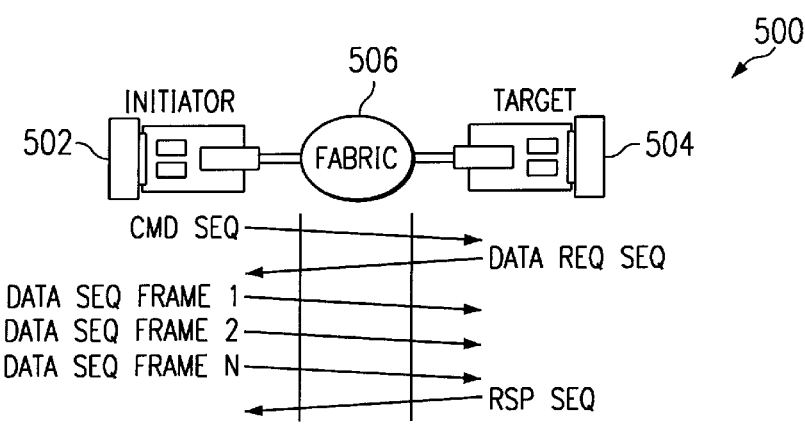
FIG. 5 shows a data processing system in which the present invention may be implemented.

FIG. 5 shows a data processing system in which the present invention may be implemented. Data processing system 500 includes an initiator 502 connected to a target by fabric 506. Fabric 506 in the depicted example is a Fibre channel fabric that may have various topologies including point to point, switched, and an arbitrated loop. In data processing system 500, the flow of the exchange begins with an initiator 502 sending a command sequence, CMD SEQ 402, containing one frame to target 504. The payload within this frame contains the command descriptor block (CDB). Target 504 will then respond with a data delivery request sequence, DATA REQ SEQ 404, containing one frame. The payload of this frame contains a transfer ready response. Once initiator 502 receives this response it will begin sending data sequence, DATA SEQ 406, containing one or more frames (DATA OUT phase). Once the target has received the last frame, it will send a response sequence, RSP SEQ 408, containing one frame. This sequence concludes the SCSI exchange.

The present invention provides a system, architecture and method for transferring data between different data protocols. The depicted example is directed towards the transfer of data between a SCSI protocol and a Fibre channel protocol. The present invention is employed to connect a host to a high speed Fibre Channel interface and may be employed in all Fiber Channel topologies including the switched fabric, point-to-point and, most importantly, the arbitrated loop.

Figure 6:
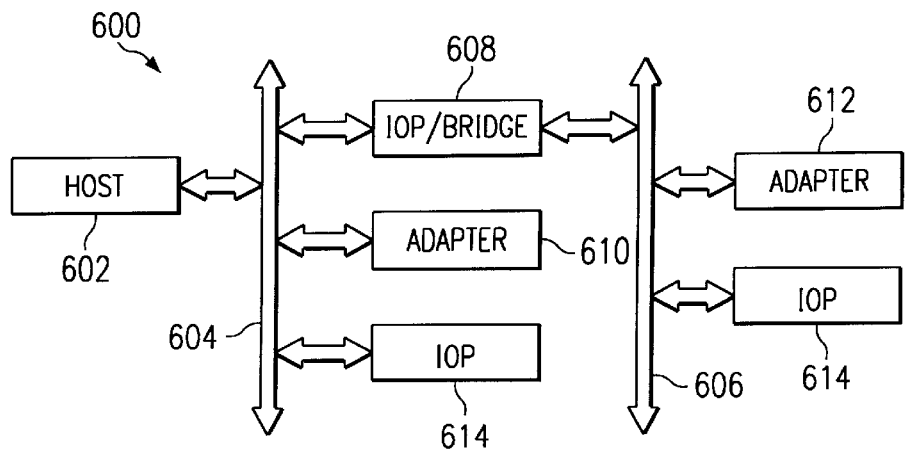
FIG. 6 is a block diagram of a data processing system in accordance with a preferred embodiment of the present invention.

With reference now to the figures and in particular to FIG. 6, a block diagram of a data processing system is depicted in accordance with a preferred embodiment of the present invention. Data processing system 600 includes a host 602, which may include one or more processors, which form the CPU or CPUs for data processing system 600. Data processing system 600 is a data processing system designed along the Intelligent Input/Output (I₂O) Architecture Specification, version 1.5, March 1997 available from the I₂O Special Interest Group, which is incorporated herein by reference. The present invention, however, may be implemented using other system architectures.

The processors within host 602 may be, for example, a Pentium II processor operating at 300 Mhz, which is available from Intel Corporation and Santa Clara, Calif. In the depicted example, primary bus 604 and secondary bus 606 are PCI buses although the present invention may be implemented using other types of buses.

Still referring to FIG. 6, data processing system 600 includes a primary input/output platform (IOP) 608, which is connected to host 602 by primary bus 604. Additionally, IOP 608 is connected to secondary bus 606 and also functions as a PCI-to-PCI bus bridge. Data processing system 600 also includes adapter 612 and adapter 614. Secondary IOPs 610 and 616 are intelligent adapters under 120 and secondary IOP 610 and secondary IOP 616 contain input/output processors. Adapters 612 and 614 are non-intelligent adapters, which do not contain input/output processors.

The system of the present invention utilizes Request and Reply Message Queues as the mechanism to transfer Request messages from the host to the chip, and Reply messages from the chip back to the host. Request denotes the path from host through the chip to the device, while Reply denotes the path from the device through the chip up to the host.

Request and Reply Message Queues are preallocated lists of message frames, residing in shared or host memory. Internally to chip, each queue is characterized by two FIFOs, a Free List and a Post List, each containing addresses of message frames in the preallocated Message Pool. The Free and Post Lists are not visible to the host, but support the chip in managing free and posted messages within the message pool.

At the time the chip is initialized, the host selects how the Request and Reply Queue should be managed. By default, the Request Queue resides in Shared Memory between the host and the chip. As an option, the Request Queue can reside in host memory. The Reply Queue always resides in host memory. Access to both the Request and Reply Queue is provided through two registers mapped to PCI address space.

Figures 7, 12:
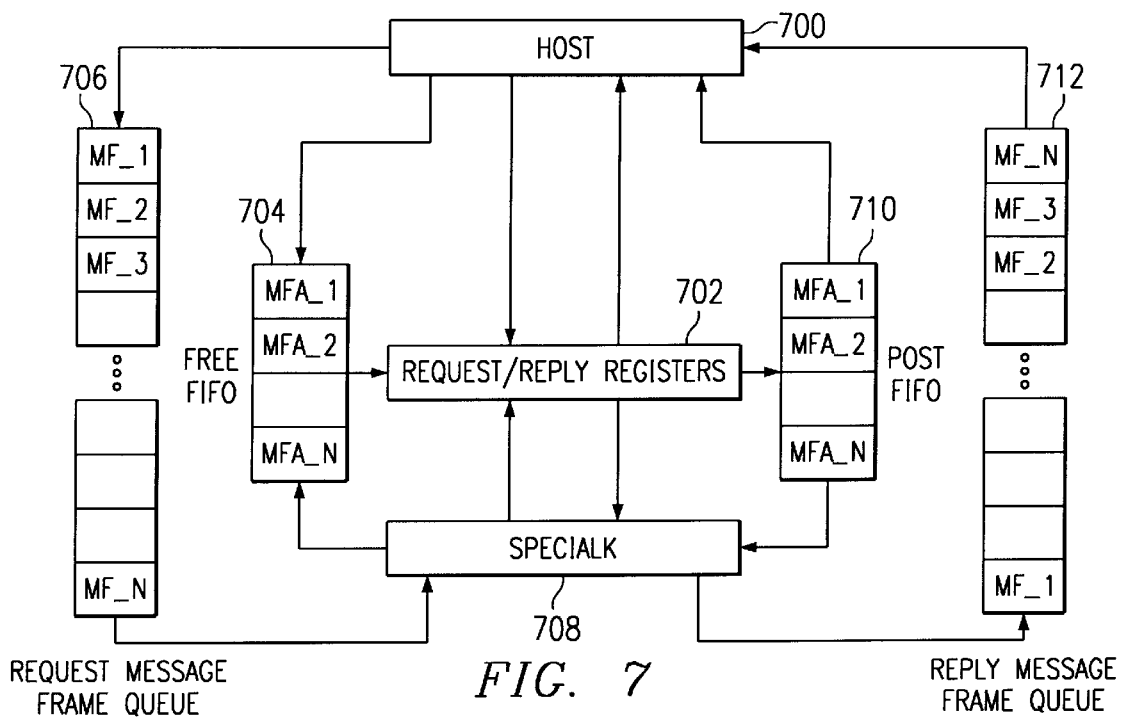
FIG. 7 is a diagram illustrating message request processing in accordance with a preferred embodiment of the present invention.
FIG. 12 is a format for a received control block in accordance with a preferred embodiment of the present invention.

With reference next to FIG. 7, a diagram illustrating message request processing is depicted in accordance with a preferred embodiment of the present invention. Host 700 builds a message and allocates a free message frame by reading Request/Reply Registers 702 to retrieve the address of the next empty message frame from the Message Frame Pool in free FIFO 704. Host 700 then writes its request into the message frame in request queue 706. Thereafter, host 700 writes the frame's address to the Request/Reply Registers 702, which posts the request to chip 708 in post FIFO 710 for service. Host 700 may then repeat this process to post more requests, until the available free messages are depleted. Chip 708 will read the posted request by reading the address of the request from the Request/Reply Registers 702, processing the message at the address in request queue 706, and writing the message address (now an empty message frame) back to the Request/Reply Registers 702. If there are no free message frames when host 700 reads the Request/Reply Registers 702, the value supplied by chip 708 is FFFF-FFFFh in the depicted example.

Reply Queue 712 is managed in a manner similar to that of request queue 706, except chip 708 becomes the producer. Host 700 has the responsibility to allocate the Reply Message Pool in replay queue 712, and post the address of each message frame to Reply Register 714. When chip 708 wants to send a Reply, chip 708 will read the address of the next free message frame in free FIFO 704. Chip 708 fills the frame in reply message queue 712 with a message and posts the address of the frame to Request/Reply Registers 702, which writes the address to post FIFO 710. Chip 708 may post multiple Replies, by repeating this process. Host 700 will read the Request/Reply Registers 702 to retrieve the address of the posted Reply message from post FIFO 710. Once the host has consumed the message, the host writes the address (now a free message frame) to the Request/Reply Registers 702, which writes the address into free FIFO 704. If no posted messages are present when the host 700 reads the Request/Reply Registers 702, host 700 will receive the value of FFFF-FFFFh in the depicted example.

The present invention uses Request and Reply Queues to transfer Requests and Replys between the Host Driver and the chip. The manner in which the host will interact with these queues can affect performance. There are two models for message queuing used in accordance with a preferred embodiment of the present invention. The "Push-Push" model for the data transfer defines request queue memory as provided by the chip and the reply queue memory as resident in the host memory. This model requires the initiator of either the request or the reply to "Push" the data into the queue. In a number of circumstances, this model may not be optimal.

The "Pull-Push" model of data transfer requires that the Request and Reply queues reside in the host memory. Requests are "Pulled" into the chip, operating in Bus Master mode, while the Reply is "Pushed" into the host memory. This model allows chip to use host memory for all queuing. It also allows the chip to streamline its operations since it can now determine when it would want to process a command, instead of suddenly being forced to take an action, as in the Push-Push model. This option is most suitable for host environments that incur excessive processor overhead from accessing the PCI bus directly through multiple bridges.

Both the modes of operations require the same number of accesses to the PCI bus, and provide queue access through the same register set. The default option for the chip is the "Push-Push" model. The "Pull-Push" model can be invoked by a message.

Figure 8A:
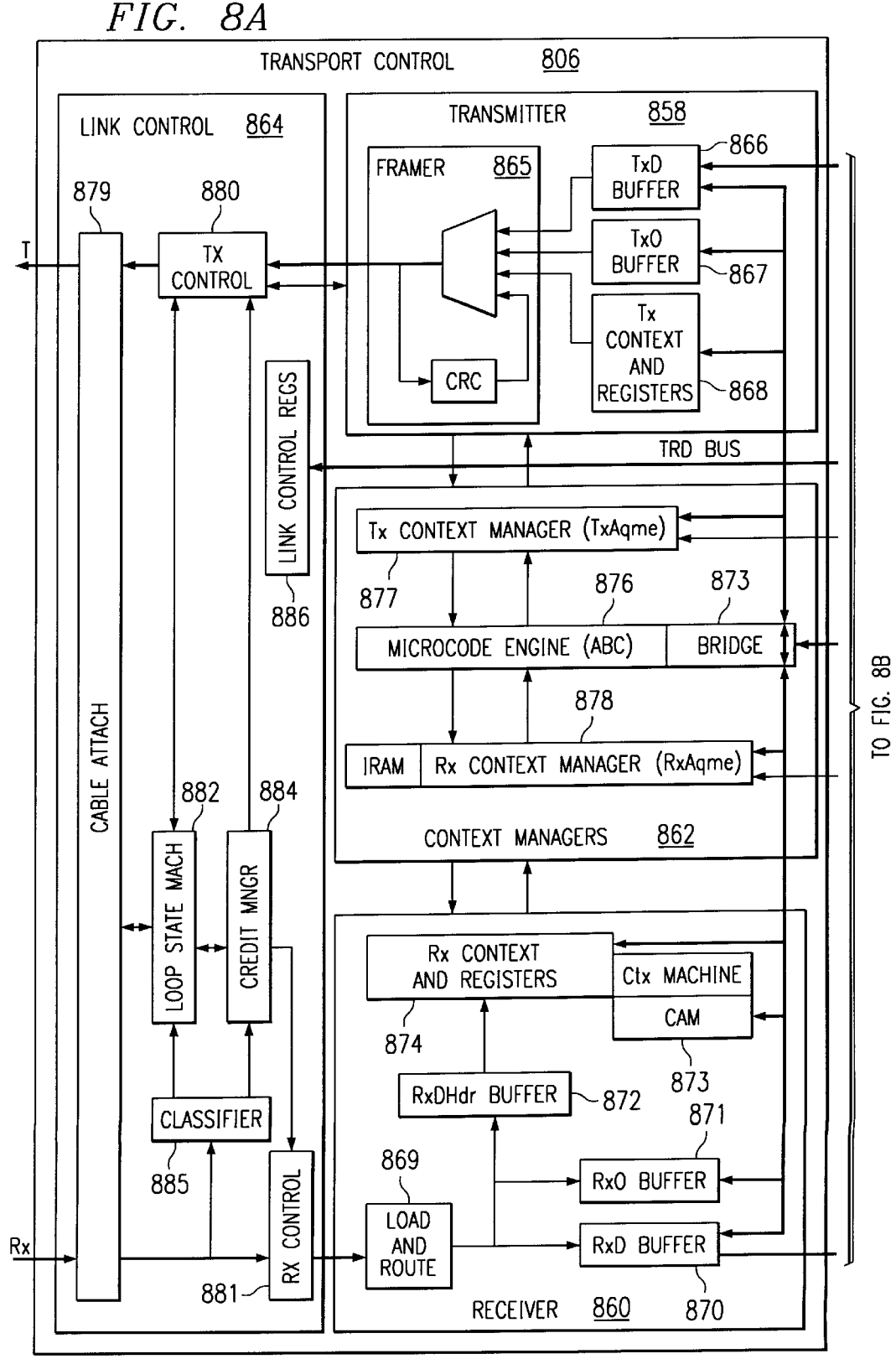
FIG. 8 is a block diagram of a chip in which a preferred embodiment of the present invention may be implemented.
Figure 8B:
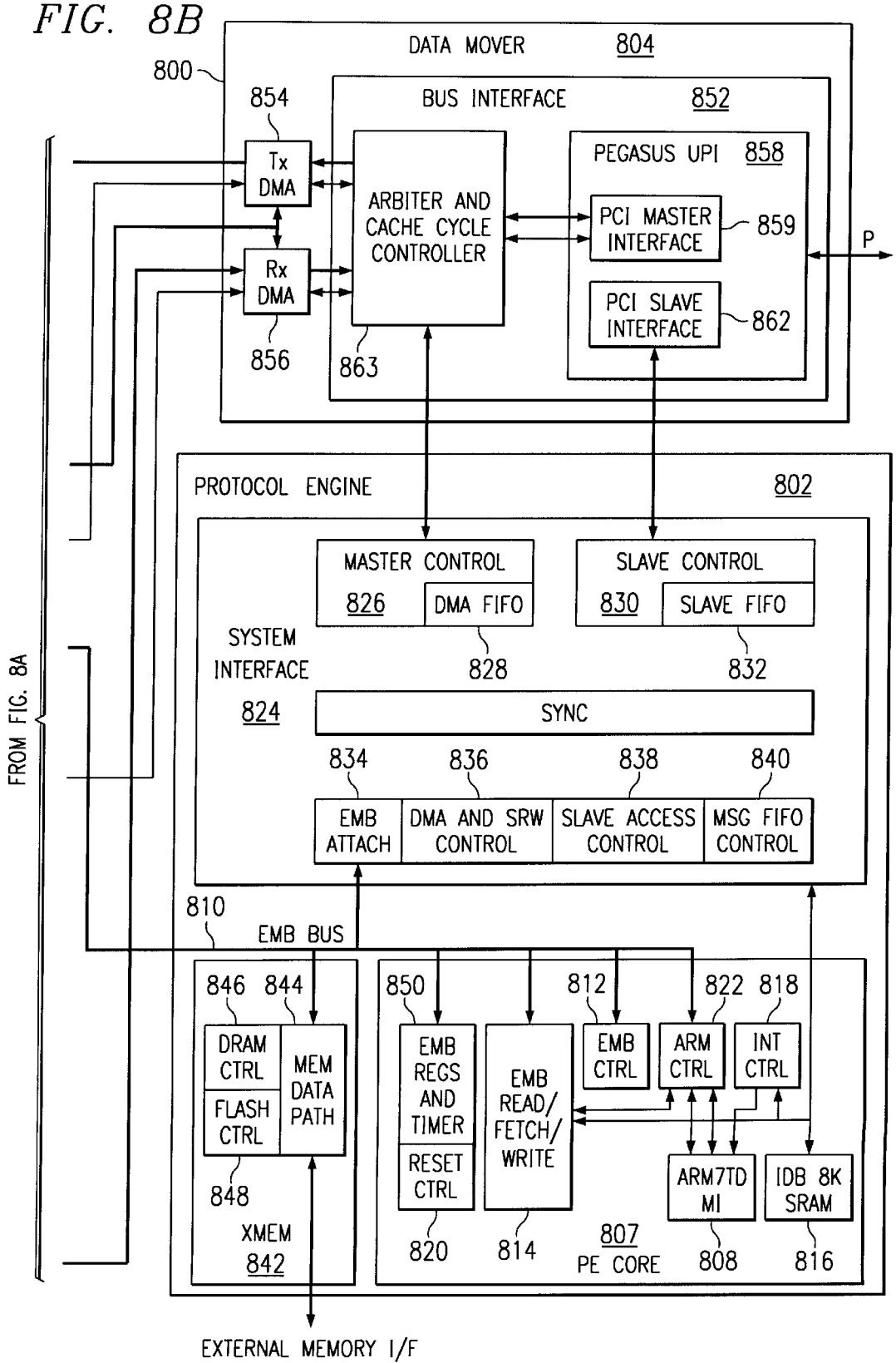

Turning next to FIG. 8, a block diagram of a chip in which a preferred embodiment of the present invention may be implemented is illustrated. Chip 800 includes a protocol engine 802, a data mover unit 804, and a transport control unit 806.

Protocol engine 802 may be implemented using a number of different types of protocol engines known to those of ordinary skill in the art. In the depicted example, protocol engine core 807 is based on a 32 bit Reduced Instruction Set Computer (RISC) core 808. RISC core 808 is capable of 20–30 Million Instructions Per Second (MIPS). Protocol engine 802 includes an embedded module bus (EMB) 810 with its own controller 812 and read/fetch/write unit 814.

EMB 810 provides a standardized module interface for inter-module communication on the bus. EMB 810 also supports multiple bus masters in the depicted example.

In the depicted example, protocol engine core 807 includes an 8 KB instruction/data buffer 816, providing a zero wait-state static RAM region for critical code and data structures. An interrupt controller 818 and a clock/reset controller 820 is found within the protocol engine core 807. RISC core 808 employs a controller 822 connected to EMB 810.

System interface 824 within protocol engine 802 supports configuration and high priority commands, packetized requests and reply messages between host and chip 800. System interface 824 is designed to minimize PCI bus traffic for non-data transfers. System interface 824 also is used to transfer I/O request and reply message packets between the host memory and chip 800. A master control 826 with a DMA FIFO 828 and a slave control 830 with a slave FIFO 832 is located within system interface 824. An EMB attach 834 provides a connection to EMB bus 810 for system interface 824. DMA and SRW control 836 and slave access control 838, message FIFO 840 are located within system interface 824. The master control and slave control units provide the data transfer between the host interface and the DMA FIFO and Slave FIFO respectively. These units burst data to/from system memory (via the bus interface unit) into and out of these FIFOs. Data from these FIFOs is then moved to/from local memory via the emb attach function (DMA FIFO) or slave access control function (Slave FIFO).

The DMA and SRW units regulate the transfer of data for burst transfers (DMA) or single-cycle transfers (SRW). The msg fifo control unit provides the necessary hardware to implement the messaging queues including reading/writing individual queue elements to/from local memory. The depicted system interface may be implemented in a number of ways to those of ordinary skill in the art to provide an interface between protocol engine 802 and data mover unit 804 other than as shown.

Protocol engine 802 contains an external memory controller 842 that provides a connection to memory external to chip 800. The memory controller 842 supports 32 bit plus parity DRAM (Fast Page and EDO), EPROM and FLASH (8 bit) and Serial EEPROM. In the depicted example, a memory data path 844 for transferring data is controlled by DRAM control 846 and flash control 848. Finally, the protocol engine 802 contains free-running timer located in EMB registers and timer unit 850. This timer may be used for event time-stamping.

The depicted example employs an ARM microprocessor core for RISC core 808 available from Advanced RISC Machines Ltd, located in Cambridge, England, and having an office in Austin, Tex.

Data mover unit 804 includes a bus interface unit 852, a transmitter DMA unit 854, and a receiver DMA unit 856. The components within data mover unit 804 may be implemented using known bus interface units, transmitter DMA units and receiver DMA units. Transmitter DMA unit 854 and receiver DMA unit 856 also are referred to as a transmit data transfer engine and a received data transfer engine, respectively. Bus interface unit 852 is employed to pass information across a PCI bus in the depicted example with the interface unit supporting both master and slave PCI bus cycles through a universal PCI interface 858 that includes PCI master interface 859 and PCI slave interface 862. Within bus interface unit 852 is an arbiter and cache cycle controller 863, which a programmable arbiter employed to arbitrate between protocol engine 802, transmitter DMA unit 854, and receive DMA unit 856. Data mover unit 804 is designed to align multiple scatter-gather data entries going to transmit buffers in transmitter DMA unit 854 or leaving receive buffers in receive DMA unit 856. The alignment is on the 32 bit double word boundary. Consequently, if any data coming in has an odd count, fill bytes are added. The Data Mover contains one transmit scatter/gather (S/G) FIFO in transmitter DMA unit 854 and two receive scatter/gather (S/G) FIFOs in receive DMA unit 856. All three FIFOs contain three S/G entries. Two entries are current S/G entries and the other entry is the next S/G entry to be processed. Data mover unit 804 may be implemented using known DMA channel designs.

Transport control unit 806 includes a transmitter 858, a receiver 860 and context managers 862, and a link control unit 864. Within transmitter 858 is a framer 865 with inputs for TxD buffer 866, TxO buffer 867, and transmit context and registers 868. Receiver 860 contains a load and route unit 869 connected to link control unit 864. Receiver 860 also includes a RxD buffer 870 and a RxO buffer 871. RxDH buffer 872, Ctx machine CAM 873, and receive context and registers 874 also are located within receiver 860. Context managers 862 contain a bridge 875, which connects context managers 862 to EMB 810, transmitter 858, and receiver 860. Microcode engine 876 controls transmit context managers 877 and receive context managers 878. Context managers 862 provide data transfer functions that free up protocol engine 802 to perform other functions. Transmitter 858 provides functions for areas including registers for status and configuration (transmitter context and registers 868), data storage buffers (TxD buffer 866 and registers 868), and a framer 865. Framer 865 is responsible for taking data from the buffers and adding any required information from the configuration registers to generate a legal Fibre-channel frame. This information includes SOF, header, payload, CRC and EOF. Framer 865 then asserts a request to link control unit 864 to send the frame to the correct destination.

Framer 865 delivers data on request of link control unit 864 until the entire frame has been sent. Framer 865 also is responsible for insuring that data is delivered from the two buffers, TxD buffer 866 and TxO buffer 867, in the order that the buffers were loaded. The crc subblock of framer 865 is responsible for calculating the error checking code as defined by the Fibre channel specification. Framer 865 inserts the calculated code at the correct point in the data stream. TxD buffer 866 contains the data loaded from the host via the PCI bus and data mover unit 804. TxO buffer 867 contains data loaded via the protocol engine. This buffer contains frames preformatted with headers, sof, eof and payload. The crc is still calculated on the fly.

Receiver 860 is responsible for taking frames addressed to this node, check the frames for correctness and then assisting in the distribution of them to the correct memory destination. The load and route function in load and route unit 869 analyzes certain fields in the header to determine to which buffer to route data to. This decision is based on traffic type (i.e. SCSI command, SCSI data, If,). Similar to the transmit side, the RxO buffer 871 contains frames that are destined to be handled by protocol engine 802. Again the entire frame (header and payload) is contained in RxO buffer 871.

Frames that are destined for RxD buffer 870 have their header information stripped out and placed in the separate RxDH buffer 872. CTx machine CAM 873 uses the header information to determine to which data transfer this frame belongs. The crc is also checked in this block and frames with invalid crcs are discarded. CTx machine CAM 873 compares the header information from the last frame and determines if it is the next frame in the sequence. If it so requests that the rxaqme provide the DMA channel with the proper s/g entries, the DMA channel then removes the data from the buffer. RxDH buffer 872 is a separate buffer and provided so that the header from a subsequent frame can be analyzed while the data from a previous frame is being removed.

Link control unit 864 includes a cable attach 879, which provides a connection to a Fibre Channel to transmit and receive data from the Fibre Channel. A transmit (TX) control unit 880 and a receive control unit 881 are found in link control unit 864. TX control unit 880 receives data from transmitter 858 and sends the data onto the Fibre Channel through cable attach 879. TX control unit 880 applies rules to determine if it is desirable and permissible to transmit a frame. If it is not desirable or permissible to transfer a frame at a selected time, TX control unit 880 determines and executes actions necessary to allow transmission of a frame. Cable attach 879 provides 8b/10b encode/decode functions and reorders bytes in the appropriate manner to be compatible with the selected external serializer/deserializer. Data is received by receive control unit 881 and sent to receiver 860. Link control unit 864 also contains a loop state machine 882, a classifier 883, a credit manager 884, and link control registers 885. Loop state machine 882 implements a state machine used to transmit data in a Fibre channel arbitrated loop (FC-AL). Loop state machine 882 manages loop related functions including the arbitration, transmission and reception protocols. Credit manager 884 is responsible for monitoring and managing a frame based credit protocol. Credit manager 884 keeps track of when credit should be given to allow another node to send a frame to this node, the node in which credit manager 884 is located. Credit manager 884 also tracks when sufficient credit is available to allow a frame to be transmitted. At any time a node has a maximum number of frames that it may send to its current destination. This is referred to as credit. Whenever a node transmits a frame it uses one credit. The receiving node receives these frames into a limited buffer pool. When a frame is removed from the buffer pool then a primitive called an R_RDY is generated. When the transmitting node receives an R_RDY it increments its credit count.

Link control register 886 contains configuration and status reporting registers for link control 864. Classifier 885 monitors incoming words from the loop and provides an encoding of the many types of primitives to other blocks. Classifier 885 provides signals to the loop state machine 882 and credit manager 884. This function in classifier 885 is provided since many blocks react to the same primitives and duplicating the decode would be unnecessary in this situation. Receive control unit 881 monitors loop state machine 882 and determines when a frame being transmitted on the loop is directed to the node in which receive control unit 881 is located. Except for TX control unit 880, which will be described in more detail below, the components within link control unit 864 may be implemented with components known to those of ordinary skill in the art using FC-AL specifications from American National Standards Institute (ANSI).

Figure 9A:
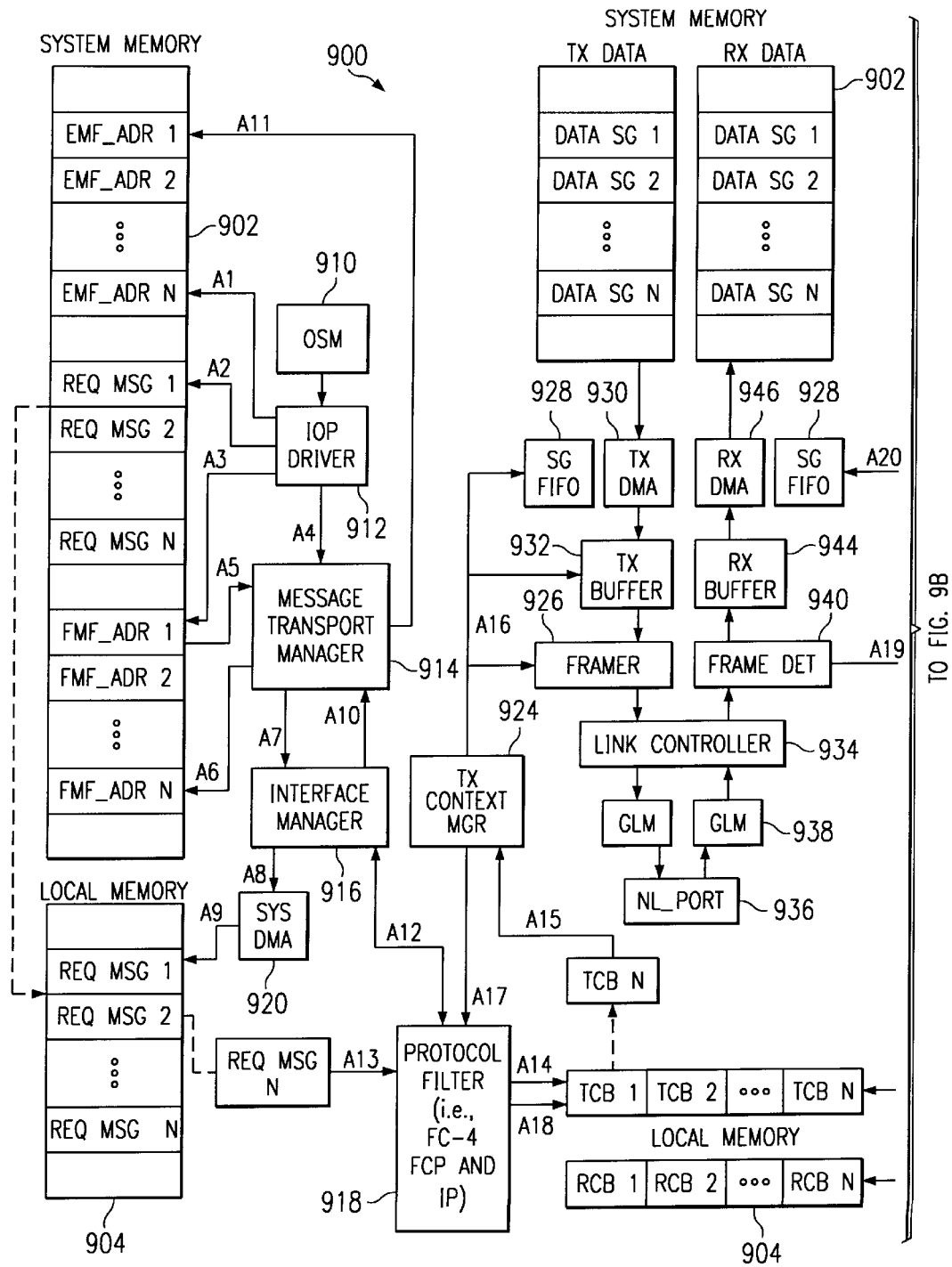
FIG. 9 is a functional block diagram illustrating data transfer within a system of the present invention.
Figure 9B:
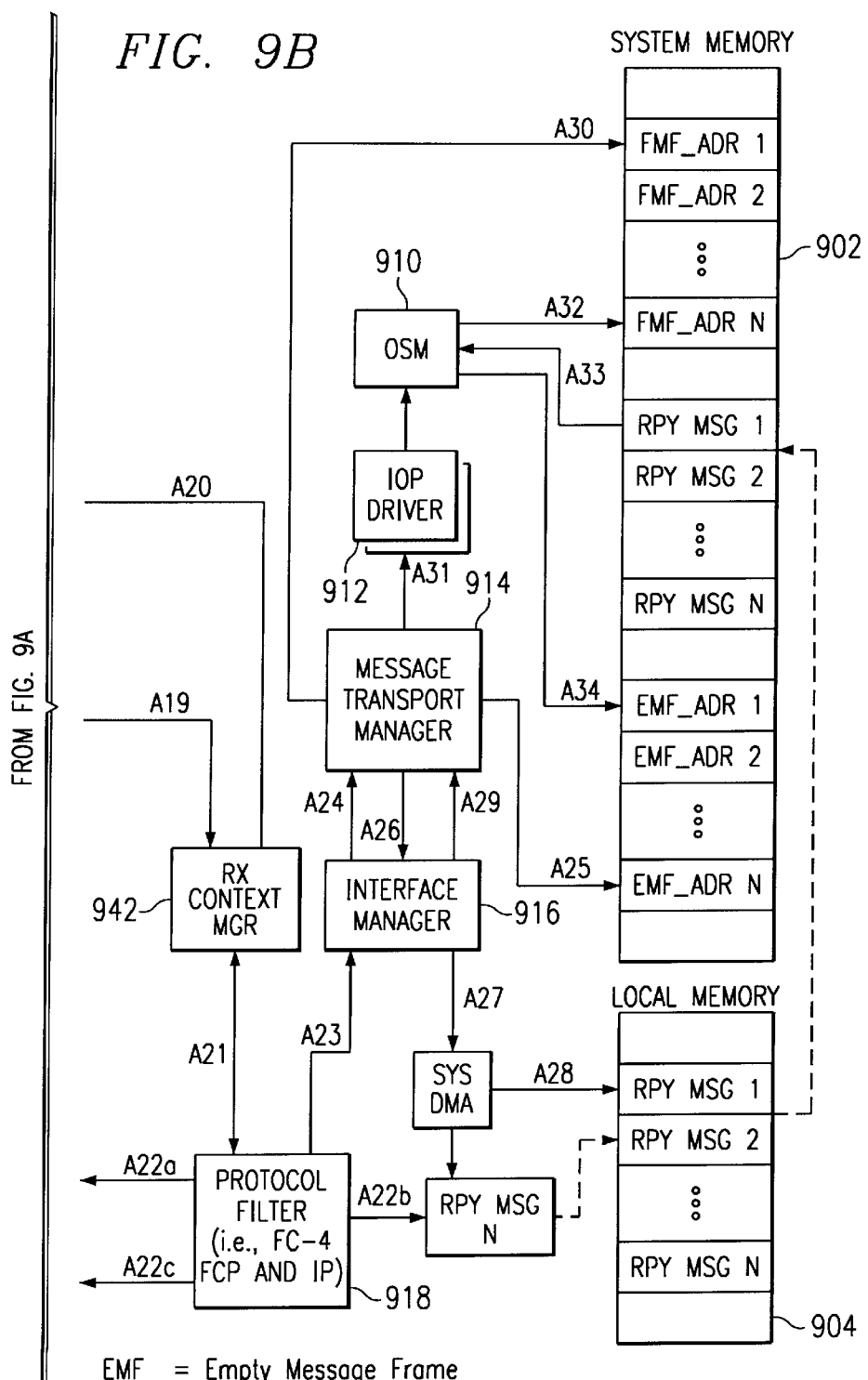

Turning next to FIG. 9, a functional block diagram illustrating data transfer within a system of the present invention. FIG. 9 shows the basic functional blocks that make up the system architecture of the present invention. Within system 900 are functional blocks that may be grouped into two major groups; the outgoing transmit and incoming receive groups. The numbered arrows between the blocks represent sequential steps in the functions provided by the architecture of the present invention. On each side of the figure are memory elements, system memory 902, local memory 904, system memory 906, and local memory 908, which contain the free circular queues and post free circular queues that are used to manage request message frames and reply message frames. Request message frame structures are on the left side of FIG. 9 within memory local memory 904, and the reply message frame structures are on the right within memory local memory 908. Located in the center of the figure are transmit and receive data paths, which will be described in more detail below with reference to FIG. 9. Operating system module (OSM) 910, I/O platform (IOP) driver 912, message transport manager 914, interface manager 916 and protocol filter 918 are illustrated as two sets of blocks to more clearly depict their roles with respect to the outgoing transmit and incoming receive groups.

Figure 10:
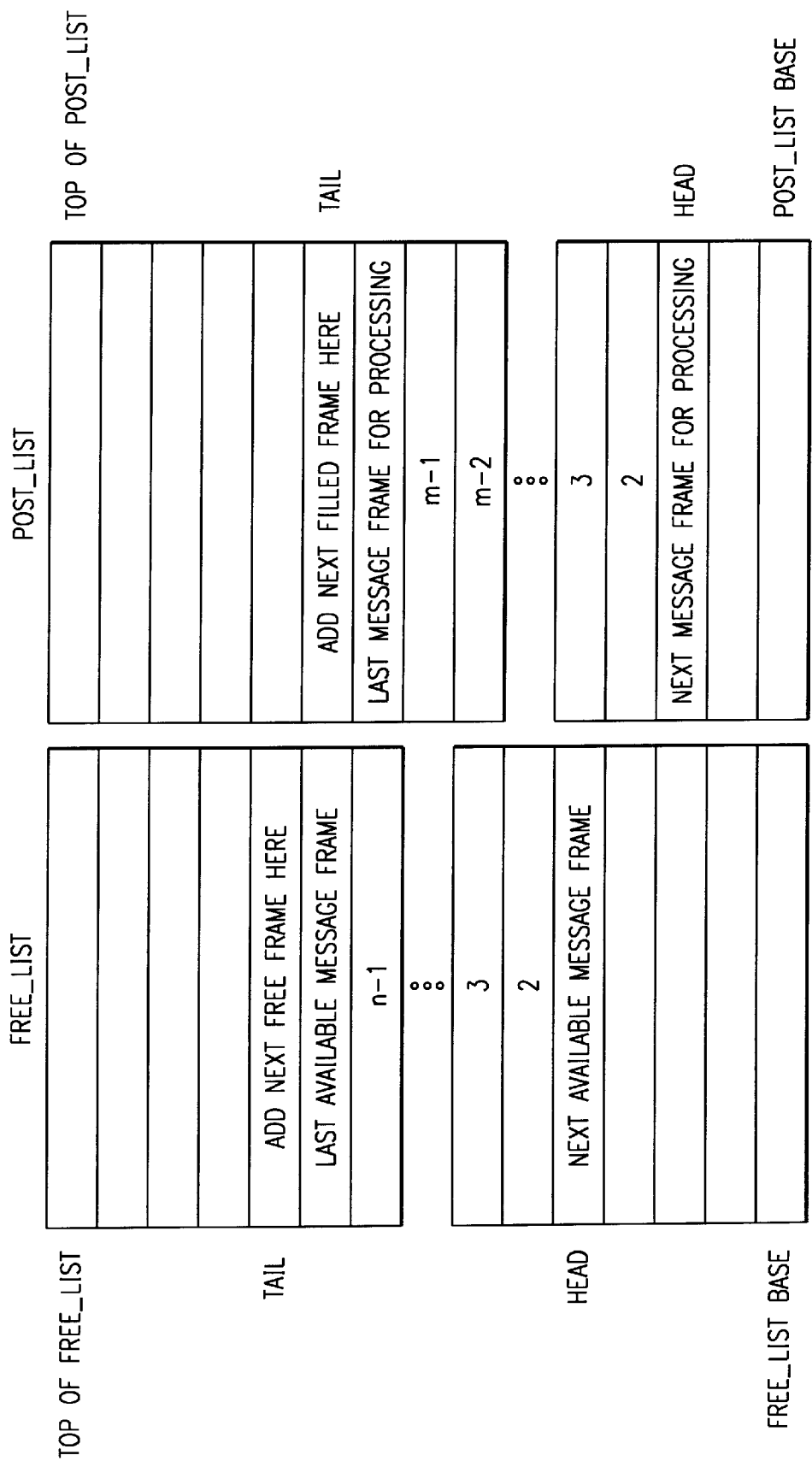
FIG. 10 illustrates a Free_List circular queue and a Post_List circular queue in accordance with a preferred embodiment of the present invention.

When a request is received from OSM 910, the IOP driver 912 obtains an address of the next Empty Message Frame for the next Request Message Frame (step A1). IOP driver 912 does this by retrieving the Empty Message Frame address (EMF_ADR) stored at the Head_Pointer within the Free_List circular queue. The Head_Pointer is then incremented. FIG. 10 illustrates a Free_List circular queue 1000 and a Post_List circular queue 1002 in accordance with a preferred embodiment of the present invention.

IOP driver 912 stores the Request Message Frame at the retrieved Empty Message Frame Address (step A2). Next, IOP driver 912 stores the Message Frame Address at the location of the Tail_Pointer located in the Post_List circular queue and the Tail_Pointer is then incremented (step A3). 4. IOP driver 912 notifies the Message Transport Manager that there are Request Message Frames for it to process. This mechanism is a register/interrupt based action.

Next, message transport manager 914 receives the address of the Request Message Frame from the Head_Pointer located in the Post_List circular queue located within system memory 902 (step A5). The Massage Transport Manager can store one or more Request Message Frame addresses in local memory and then process the Request Message Frames. This option may improve the performance of some systems. The message transport manager 914 then increments the Head_Pointer in the Post_List circular queue located in system memory 902 after message transport manager 914 receives the Request message frame address (step A6). Thereafter, message transport manager 914 notifies and provides interface manager 916 with a Request Message Frame address (step A7). In response, interface manager 916 programs an IOP System DMA 920 with the address and size of a Request Message Frame (step A8).

IOP System DMA 920 arbitrates for the PCI bus and moves the Request Message Frame into local memory (step A9). Interface manager 916 may have the IOP System DMA 920 move one or more Message Frames into local memory before it updates the Tail_Pointer in the Free_List circular queue. This option may improve the performance of some systems. Next, interface manager 916 notifies message transport manager 914 that it has moved one or more Request Message Frames to local memory 904 (step A10).

Message transport manager 914 places the address of the new Request Message Frame at the location of the Tail_Pointer in the Free_List circular queue and then increments the Tail_Pointer (step A11). By doing this, the Request Message Frame is converted back to an Empty Message Frame resource. Subsequently, interface manager 916 assists and notifies Protocol Filter 918 that Request Message Frames are available for processing (step A12). The Protocol Filter retrieves and processes each Request Message Frame from local memory 904 (step A13).

Protocol Filter 918 uses information located in the Request Message Frame to build one or more Transmit Context Blocks (TCB) (step A14). The TCBs are stored in local memory 922 and used by the Transmit Context Manager 924. Some Request Message Frames contain enough information to build exchanges. It is the Protocol Filter 918's job to manage the exchange that it builds. These exchanges might be a simple Login Exchange or a more elaborate SCSI 1,O, which includes Command, Data, Transfer_Rdy and Response sequences.

Transmit Context Manager 924 transmits TCBs whenever one becomes available (step A15). Transmit Context Manager 924 is unaware of any exchange information and is only aware of frame and sequence context. Transmit Context Manager 924 takes the top TCB out of local memory 904 and creates necessary context information for Framer 926 as well as providing the necessary Scatter/Gather (S/G) entries to the transmit S/G FIFO. Transmit context manager 924 places the S/G entries in the S/G FIFO 928 and Context information in the Framer 926 (step A16). Also when appropriate in step A16, the Transmit DMA (TX_DMA) 930 is programmed with the address and size of the S/G entry located at the top of the S/G FIFO 928 and then arbitrates for the PCI bus and retrieves data from the system memory and stores it in the Transmit buffer 932.

It is important to notice that not all data in all frames will come from the TX_DMA path. As an example, the 116 bytes of data contained in a Login frame are placed in the DMA buffer 932 via transmit context manager 924. Transmit context manager 924 does this by retrieving the Login data from local memory 904, never needing to go across the PCI bus. This has obvious performance advantages. Another obvious type of frame that does not use the TX_DMA path is the Link Control frames. The entire Link Control frame can be contained within one TCB and when the transmit context manager 924 receives this TCB it simply routes it to Framer 926, which uses the data and context information to create one or more frames for Link Controller 934.

Link Controller 934 manages the link between two Ports. As an example, when a frame is ready to be shipped out across the link, Link Controller 934 arbitrates for the loop (assuming an FC Arbitrated Loop topology) and when it wins arbitration, it opens another destination NL_Port and passes the frame(s) to it.

Once a TCB and its associated frames are transmitted, transmit context manager 924 informs the Protocol Filter 918 (step A17). Protocol Filter 918 updates the TCB entries to reflect the completion of the current TCB (step A18). If the TCB entries are linked together in a linked list, the Protocol Filter 918 may remove the completed TCB entry by adjusting the pointers in the linked list.

All data being transmitted on the link eventually becomes received data for another Port. Data coming into Port 936, illustrated in FIG. 9, first enters through Gigabaud Link Module (GLM) 938. This data is passed to Link Controller 934 where early destination recognition occurs. If the incoming frame is for Port 936, Link Controller 934 passes the frame to Frame Detector 940. Once a frame has been detected by Frame Detector 940, the header is pulled off and context information is created by the RX Context Manager 942(step A19). The incoming frame can be either a response to a transmitted TCB or it can be an unsolicited frame. If the frame is a response to a transmitted TCB, the context is already defined by the state of exchange management by the Protocol Filter. Any data destined for system memory is put in the Receive Buffer (RX_Buffer) and the S/G entries for the data is placed in the S/G FIFO 928 (step A20).

If the frame is an unsolicited frame, then a context needs to be generated. The simplest case is if the frame contains command information, as the case with SCSI interlocked exchanges. RX Context Manager 942 can create the necessary context information from the FC frame header and the SCSI command in the payload. In step A20, if this frame also contains data then the data is placed in the RX_Buffer and S/G entries are placed in the S/G FIFO 928. Once data is in the RX_Buffer 944 and S/G entries are in the S/G FIFO 928, then Receive DMA (RX_DMA) 946 is programmed with the S/G address and size. RX_DMA 946 then arbitrates for the PCI bus and transfers the data across the bus into system memory.

The context information is passed from the RX Context Manager 942 to the Protocol Filter 918 (step A21) where several things can occur depending on the context. Any time Protocol Filter 918 or RX Context Manager 942 needs to send Link Response frames, this is done by adding a TCB entry to the top of the TCB linked list (step A22*a*). An example of this might be when Protocol Filter 918 needs to generate an ACK frame for one or more received frames.

When Protocol Filter 918 is notified that the Requested Message Frame is completed, it will create a Reply Message destined for the OSM and Protocol Filter 918 will place the Reply Message in local memory 904 (step A22*b*).

Any unsolicited frames coming in that contain enough information to create context and protocol information will cause Protocol Filter 918 to build Receive Context Blocks (RCB) (step A22*c*). An example of this would be if the system of the present invention is in a SCSI target mode. When a frame comes in containing the Command Descriptor Block, Protocol Filter 918 will need to generate an RCB linked list to manage the exchange state from a target's perspective.

Once Protocol Filter 918 has created one or more Reply Message Frames, it will notify interface manager 916 that Reply Message Frames are present that need to be sent to the OSM 910 (step A23). Interface Manager 916 then sends a request to Message Transport Manager 914 to obtain an address for the Reply Message Frame (step A24). message transport manager 914 gets the address of the next Empty Message Frame for the Reply Message Frame (step A25). In step A25, Message Transport Manager 914 does this by retrieving the Empty Message Frame Address stored at the Head_Pointer within the Free_List circular queue located in system memory. The Head_Pointer is then incremented.

Message Transport Manager 914 provides interface manager 916 with this Empty Message Frame address (step A26). Interface Manager 916 programs IOP System DMA 920 with the retrieved Empty Frame Address and length of the Reply Message Frame (step A27). Then, IOP System DMA 920 arbitrates for the PCI bus and when it wins the PCI bus, system DMA 920 moves the Reply Message Frames to the Empty Message Frame Address located in system memory 902(step A28). Once one or more Reply Message Frames are transferred, interface manager 916 notifies the Message Transport Manager 914 (step A29). When notified, message transport manager 914 stores the Reply Message Frame Address at the location of the Tail_Pointer located in the Post_List circular queue and the Tail_Pointer is then incremented (step A30).

Message Transport Manager 914 notifies IOP Driver 912 that there are Reply Message Frames for it to process (step A31). In the depicted example, this mechanism is a register/interrupt based action. IOP Driver 912 receives the address of the Reply Message Frame from the Head_Pointer located in the Post_List circular queue (step A32). IOP driver 912 can store one or more Request Message Frame addresses in its system memory and then processes the Reply Message Frames. This option may improve the performance of some systems. Also in step A32, the Head_Pointer in the Post_List circular queue is then incremented. IOP Driver 912 retrieves the Reply Message Frames and sends them back to the OSM 910 (step A32). IOP Driver 912 places the address of the current new Reply Message Frame at the location of the Tail_Pointer in the Free_List circular queue and then increments the Tail Pointer (step A34). By doing this, the Reply Message Frame is converted back to an Empty Message Frame resource.

Transmit context manager 877 has a number of responsibilities, including reading data from a transmit queue of TCBs, created by protocol engine 802. The TCBs are located in a local memory connected to memory data path 844. Transmit context manager 877 also load the transmit registers, buffers and transmit DMA unit 854 (registers or FIFO registers) when TCBs are present and transmitter 858 is idle. In addition, transmit context manager 877 feeds transmit DMA unit 854 S/G entries as needed from a S/G list, removing interrupts to protocol engine 802. Transmit context manager 877 also re-links TCBs from the transmit queue to the free queue when each TCB has finished transmitting by re-writing pointers in the linked list of TCB data structures.

Figure 11:
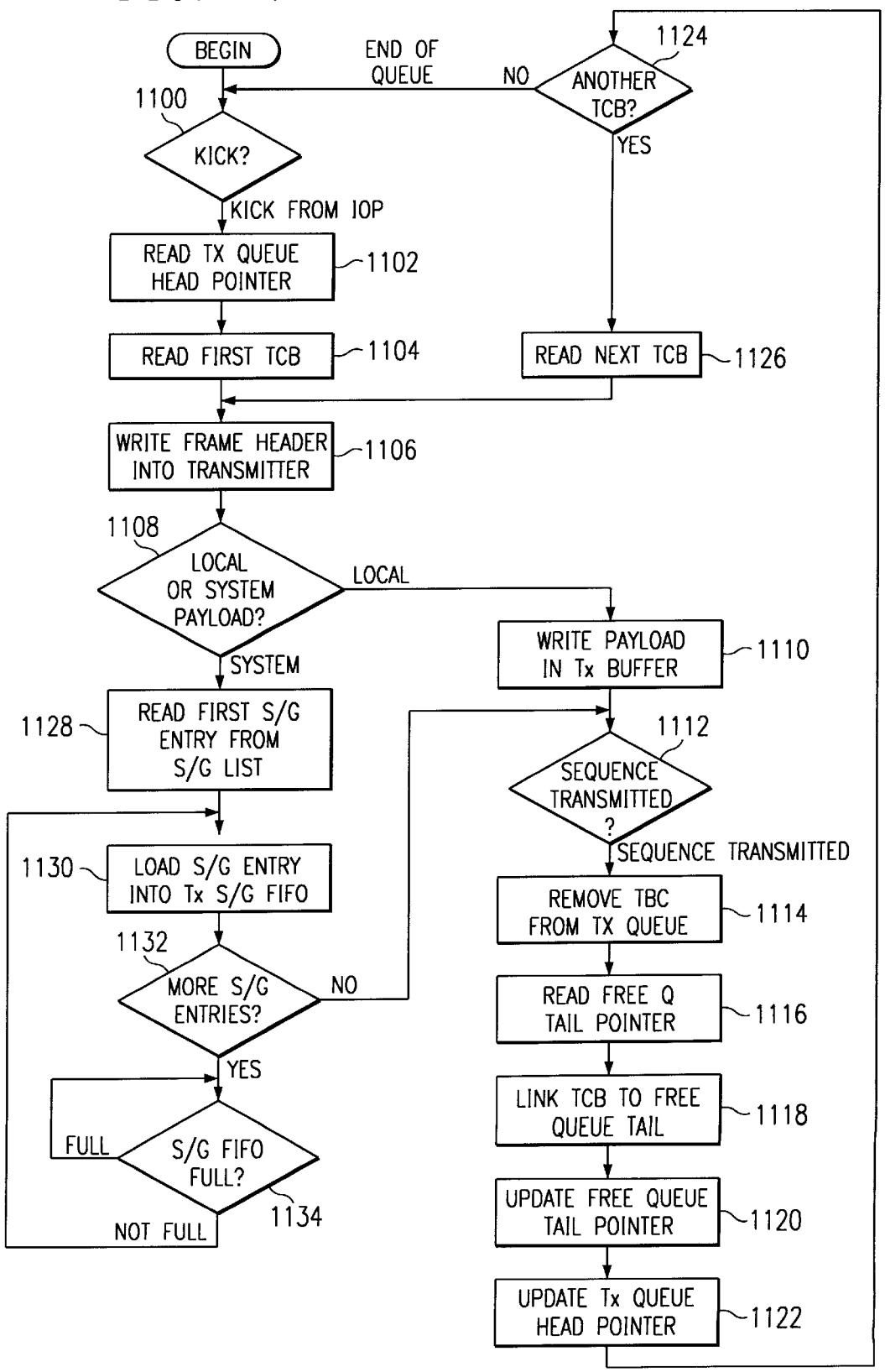
FIG. 11 is a flowchart illustrating processes implemented in a transmit context manager in accordance with a preferred embodiment of the present invention.

With reference now to FIG. 11, a flowchart illustrating processes implemented in a transmit context manager is depicted in accordance with a preferred embodiment of the present invention. The process begins by determining whether a kick from the IOP has occurred (step 1100). A "kick" is a write to Tx context and registers unit 868. The process continues to return to step 1100 until the kick from the IOP occurs. At that time, the transfer queue head pointer is read from the register (step 1102). Thereafter, a first TCB is read (step 1104), and a write frame header is written into the transmitter (step 1106). A determination is then made as to whether the pay load for the frame is a local or system payload (step 1108). If the payload is a local payload, the payload is written into the transmitter buffer (step 1110). In the depicted example, the transmitter buffer is TxO buffer 867. Thereafter, a determination is made as to the sequence has been transmitted (step 1112). A sequence is a series of frames created by framer unit 865 initiated by a single programming of registers in Tx context and registers unit 868. The process continues to return to step 1112 until the sequence has been transmitted. Upon transmission of the sequence, the TCB is removed from the transmitter queue (step 1114), and a free queue tail pointer is read (step 1116). This read is from Tx context and registers unit 868. The TCB is linked to the free queue tail (step 1118). Thereafter, the free queue tail pointer is updated (step 1120), and the transmit queue head pointer is updated (step 1122). The updating of pointers are writes to Tx context and registers unit 868. Then, a determination is made as to whether a TCB is present (step 1124). If another TCB is present, the process reads the next TCB (step 1126) with the process then proceeding to step 1106 as described above. If another TCB is not present, the end of the queue has been reached and the process returns to step 1100.

With reference again to step 1108, if the payload is a system write, the process then reads S/G entry from the S/G list (step 1128). Then, the S/G entry is loaded into the transmit S/G FIFO (step 1130). Thereafter, a determination is made as to whether more S/G entries are present (step 1132). If more S/G entries are not present, the process then proceeds to step 1112 as described above. Otherwise, the process determines whether the S/G FIFO is full (step 1134). If the S/G FIFO is not full, the process returns to step 1128. Otherwise, the process continues to return to step 1134 until the FIFO is not full.

Receive context manager 878 provides automation to Fibre channel receive context management, thereby reducing the workload of other devices and/or system resources, such as protocol engine 802. Receive context manager 878 provides various functions, including context management, DMA start, DMA update, and frame complete processing. Context management includes reconciling Fibre channel header information to receive control blocks (RCBs), which provide a means of validating Fibre channel sequence information and specifying data transfer parameters. The DMA start function includes programming received DMA 856 with an initial starting point by mapping the Fibre Channel Header Parameter field to the correct buffer offset and initiating the DMA transfer. The DMA update function includes updating receive DMA 856 with additional buffer address/ength information as required to sustain the frame DMA transfer. In frame complete processing, updating of receive DMA information, detection of Fibre channel sequence completion, and conditional completion reporting occurs.

Turning next to FIG. 12, a format for a received control block is depicted in accordance with a preferred embodiment of the present invention. Receive control block 1200 contains information required to manage Fibre channel sequences. Fibre channel header fields 1202 contain information used to validate an incoming frame. Sequence status information fields 1204 are used to track and manage Fibre channel sequences. DMA information fields 1206 are employed to track and manage mapping of Fibre channel data to destination addresses. Finally, time stamp field 1208 is employed to indicate a sequence has been completed.

With reference now to FIG. 13, a flowchart used to perform context switching is depicted in accordance with a preferred embodiment of the present invention. Context switching begins when the frame receiver signals the received context manager that a context switch is needed. This situation occurs when the current Fibre channel header does not match the currently established received context. At this time, the received context manager will locate the next context which is in an RCB (step 1300). Thereafter, a determination is made as to whether the frame is a first frame of a new Fibre channel sequence for this RCB (step 1302). The determination of whether a received frame is the first frame received for a particular sequence is based upon the "active" bit within the Context Status word of the RCB. This bit is initially set to '0' by the protocol engine to indicate that this particular sequence is not active (no frames have yet been received). When receive context manager performs context lookup and switching and determines that the relevant RCB does not yet have this bit set, it performs the actions described in step 1304 and then sets to '1' the "active" bit in the RCB. If the answer is yes, the RCB is updated with a sequence ID (S_ID) and a received ID (RX_ID) and a sequence count (SEQ_CNT) is employed to set expected values for this sequence (step 1304).

Thereafter, a determination is made as to whether the frame receive context is valid (step 1306). A frame receive context is typically valid if a previous sequence is incomplete. Step 1306 stores the state of the previous and complete sequence so that the sequence may be completed at a later time when another frame is received for that sequence. This determination also is made directly from step 1302 if the first frame is not this RCB. If the frame receive context is valid, the previous frame received context is saved to memory (step 1308) and a new frame receive context is loaded from memory (step 1310). If the frame receive context is not valid, the process skips step 1308 and proceeds to load a new frame receive context from memory in step 1310. Thereafter, a signal is sent to the receiver to reevaluate the frame receive context (step 1312), with the process terminating thereafter.

Turning next to FIG. 14, a flowchart of a DMA start process is depicted in accordance with a preferred embodiment of the present invention. When the frame receiver evaluates a Fibre channel header and determines that this header matches the currently established received context as previously loaded, the frame receiver signals the received context manager that a frame transfer is needed. At that time, the received context manager initiates the DMA start process. This process begins by determining whether the frame relative offset is greater than the RCB current relative offset (step 1400). If the answer to this determination is no, the process scans the S/G list backwards until a correct entry is found (step 1402). If the answer to this determination is yes, the S/G list is scanned forward until the correct entry is found (step 1404). Steps 1400–1404 are employed to find the proper starting DMA S/G element (RCB current S/G pointer) by comparing the Fibre channel header parameter field to the RCB current relative offset field and then scanning through the DMA S/G list using the RCB base S/G pointer and the RCB current S/G pointer, either forwards or backwards to find the correct starting S/G element. These steps allow frames received out of order to be properly mapped to the correct DMA buffer addresses.

Next, the address and length information is adjusted (step 1406). This step calculates the actual start and length for this frame within the found S/G element based on the Fibre channel header parameter field and the RCB current S/G pointer address, RTCB current S/G pointer length, and RCB current relative offset. Next, the received DMA is programmed with the address and length information and a DMA transfer is initiated (step 1408), with the process terminating thereafter.

With reference now to FIG. 15, a flowchart of a DMA update process is depicted in accordance with a preferred embodiment of the present invention. When Fibre channel frame pay load data spans multiple DMA S/G entries, the received context manager provides additional DMA programming information to the received DMA unit in order to continue the frame DMA transfer. The received DMA unit signals its need for additional S/G entries, which begins the process by obtaining the next S/G element and updating the current relative offset, which relates to this S/G element (step 1500). thereafter, the received DMA unit is programmed with the address and length information determined ins step 1500 and the DMA transfer is initiated to continue the transfer of data (step 1502) with the process terminating thereafter.

Figure 16:
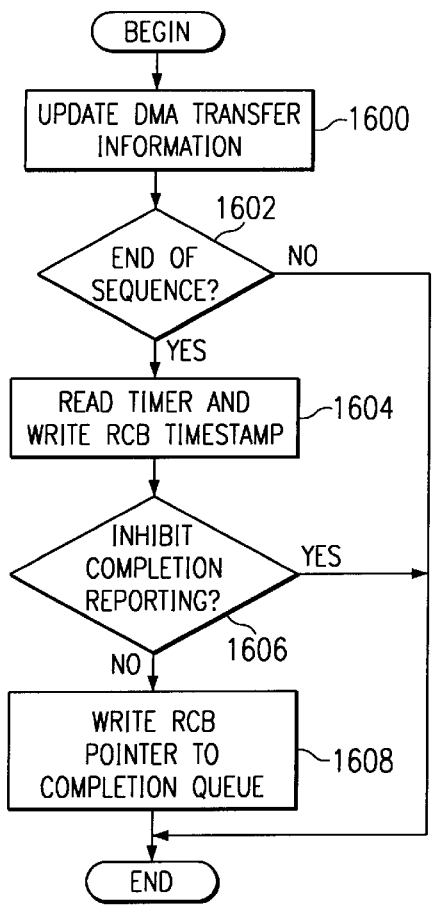
FIG. 16 is a frame complete processing process in accordance with a preferred embodiment of the present invention.

With reference now to FIG. 16, a frame complete processing process is depicted in accordance with a preferred embodiment of the present invention. Upon completion of a received DMA operation, as indicated by a frame transfer n signal from a received DMA unit, the received context manager begins the frame complete processing by updating DMA transfer information in the RCB (step 1600). Thereafter, a determination is made as to whether the end of the sequence has been reached (step 1602). If the end of the sequence has been reached, the timer is read and the RCB time stamp field is written with the timer value from EMB registers and timer unit 850 (step 1604). Thereafter, a determination is made as to whether completion reporting should be inhibited (step 1606). If reporting is not to be inhibited, the RCB pointer is written to the sequence completion queue (step 1608) with the process terminating thereafter.

With reference again to step 1606, if reporting is to be inhibited, the process terminates. The process also terminates if the end of the sequence has been reached in step 1602.

Link control unit 864 is the link between two ports. Link control unit 864 is used in sending and receiving data within chip 800. The functions provided by link control unit 864 depends on the topology of the link. For example, if the link is a point to point topology, link control unit 864 will only provide for transfer of data. If an arbitrated loop topology is being used, link control unit 864 will provide additional functions in managing the loop. The term "loop" means a collection node wired to transfer data in a uni-directional manner. Each node is a source or destination for data on the loop, such as for example, an adapter, a computer, or a remote storage unit.

Figure 17:
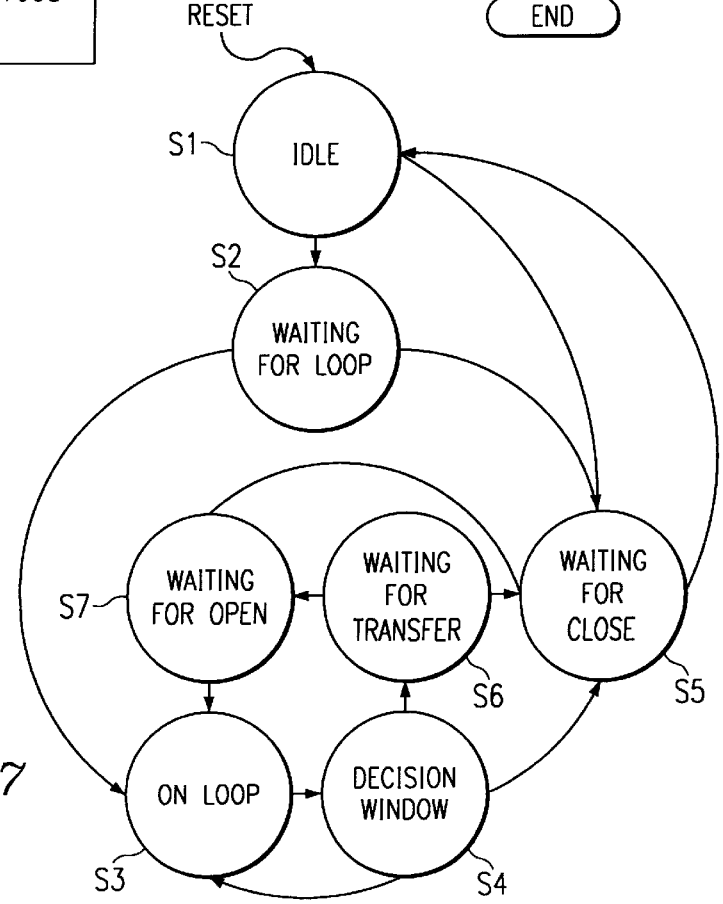
FIG. 17 is a state machine for loop management control in accordance with a preferred embodiment of the present invention.

Turning next to FIG. 17, a state machine for loop management control is depicted in accordance with a preferred embodiment of the present invention. State machine 1700 that may be implemented within transfer control unit 880 in link control unit 864. Link control unit 864 provides access to an arbitrated loop in the depicted example. In an arbitrated loop, an arbitration process is employed to determine which node has the right to transmit data. Link control unit 880 tries to obtain access to the arbitrated loop for data transfer by sending out a request for the loop. The request is made by sending an arbitration primitive also referred to as an ARB primitive. When the loop is acquired, the present invention monitors node and loop activity to maximize overall performance of the loop. The present invention identifies and estimates when traffic is about to be ready or stopped and of what activity is being requested on the loop in maximizing performance of the loop.

State machine 1700 begins in state S1, which is an Idle State, and remains in this state until a request is made that the loop be acquired for a particular destination or node. When the loop is to be acquired, state machine 1700 in state S1 requests the loop to enter the arbitration processes to acquire ownership of the loop. The loop is requested only when data is read to transmit to a target or destination node or as soon as it is known that data will be available to transmit to the destination node.

In response to a request to acquire the loop, state machine 1700 shifts into state S2, Waiting For Loop State, in which state machine 1700 sends an open primitive after the ownership of the loop has been acquired. In state S2, state machine 1700 waits for the loop to become available for transfer of data by the node in which state machine 1700 is executing. The node is in an arbitration won state when the node has arbitrated for and won the loop. An "open" (OPN) primitive is sent out onto the loop in which the primitive specifies the target node. A node is considered an "open" node when the OPN primitive is sent. The open node is the source node. The open node may break and stablish connections to different nodes without being required to reenter the arbitration process for the loop. An "opened" node is a node to which an open node has established a connection. The opened node is the destination or target node. The opened node may return data to the open node if any is available, but may not send data to any other node. A "connection" is made by an open node identifying the destination node to which the source node desires to send data. The connection is established when the OPN primitive is sent. A full handshake is not required in establishing a connection. Only closing connection requires a full handshake—returning of a primitive.

State machine 1700 shifts to state S3, an On Loop State, in response to a connection being established to the requested node and the rules allow a frame to be sent. A "frame" is a packet of data with header information added. Generally, a node is unable to start sending a frame until all data is known to be available on demand since the transmission of a frame cannot be paused in the depicted example. When state machine 1700 is in state S3, a frame may be sent onto the loop to the node. In response to a completion of the frame, state machine 1700 shifts to state S4, which is a Decision Window State, to wait to see if an additional frame is ready to send. If an additional frame is ready to be sent to the same node as the previous frame. In additional the destination is ready to accept an additional frame, state machine 1700 shifts back to state S3. A process of handshaking occurs between the transmitting node and the receiving node to avoid buffers in the receiving node from being overrun. This handshaking also is referred to as a "credit". This shifting between state S3 and state S4 as long as frames of data are ready for transfer to the destination. In state S4, if no additional data if available to send to the node or if the rules dictate that the loop be released, state machine 1700 then shifts to state S5, Waiting For Close State, in no more data is to be sent to the node. In this state, a "close" (CLS) primitive is sent onto the loop to release the loop. When the close primitive handshake has been completed and the loop is no longer open, state machine 1700 then returns to idle in state S1. When a close occurs, ownership of the loop is not always necessarily given up. If a transition is taken from decision_window-waiting_for_close-idle, then ownership of the loop has been given up. If it desired to not give up ownership then the decision_window (state 54) to waiting_for_transfer (state 56) to waiting_for_open loop (state 57) path is taken. This basically does the same CLS handshaking as the previous route but ownership of the loops is retained. This is part of the reason than an OPN may not be immediately sent in the waiting_for_open state.

Referring again to state S4, if an additional frame of data is available and allowed, but is for a different node but requires that a different node be opened, state machine 1700 then shifts to state S6, which is a Waiting For Transfer State. In state S6, state machine 1700 sends transfer requests for a different node. This request in state S6 includes sending a close primitive and waiting for the close primitive to be returned. Upon determining that the previous connection has been closed, but the rules do not allow an open to be sent yet, state machine 1700 shifts to state S7, which is a Waiting For Open State, in which state machine 1700 sends an open primitive to open the new node. In state S7, state machine 1700 waits so that a time gap occurs prior to transferring data. When the connection to the requested node has been established, state machine 1700 then shifts to state S3 to send a frame of data to the node.

Turning back to state S6, while waiting for a response to a close primitive, state machine 1700 may shift to state S5 to close the loop in response to a rule requiring that the request for the new node be aborted. State machine 1700 also may shift from state S7 to state S5 in response to a rule requiring that the request be aborted. In state S1, if a close primitive has been received and a response with a close primitive is required, state machine 1700 will shift to state S5 to send a close primitive then return to state S1. Referring back to state S2, while waiting for access to the loop, state machine 1700 shifts to state S5 in response to receiving a close primitive requiring a close primitive in response or if the rules require that the transmission request be aborted.

Figure 18:
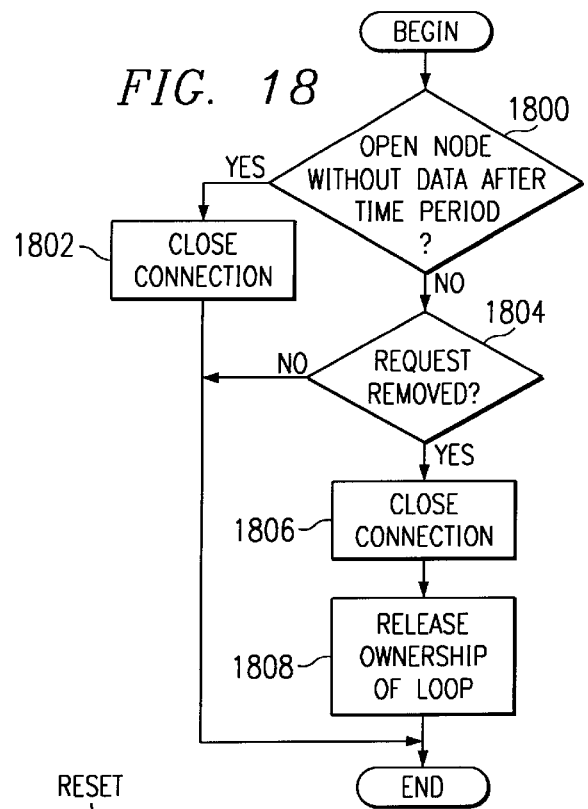
FIG. 18 is a flowchart of a process for managing a loop in an open state in accordance with a preferred embodiment of the present invention.

With reference now to FIG. 18, a flowchart of a process for managing a loop in an open state is depicted in accordance with a preferred embodiment of the present invention. The process begins by determining whether a node has opened the node in which the state machine is executing and is not transmitting data because of a lack of credit and is not closing the connection after a reasonable period of time (step 1800). If a selected period of time has passed without data transfer, the process then closes the connection (step 1802) with the process terminating thereafter. If such a situation is not present, a determination is made as to whether the request to transmit data has been removed (step 1804). A request may be removed for various reasons, such as, for example, it is due to host request or an error condition recovery, the transmitter may remove a request to transmit data. If the request has been removed, the connection is closed (step 1806) and ownership of the loop is released (step 1808) with the process terminating thereafter.

Turning next to FIG. 19, a flowchart of a process incorporating rules used to in the idle state to control acquisition of the loop is depicted in accordance with a preferred embodiment of the present invention. In the depicted example, ports are placed in a "greedy" state in which loop ownership once gained is kept as long as a chance is present that data will be available soon. Additionally, in this state a node will keep the loop ownership if it does not detect that another node desires access to the loop.

The process begins by determining whether a greedy state is present (step 1900). If a greedy state is present, the process determines whether the node is loading data (step 1902). This node is the source node. If the node is not loading data, the process then holds the state machine in the idle state (step 1904) with the process terminating thereafter. If the node is loading data, the loop is then acquired (step 1906) and the state machine is shifted to the Waiting for Loop State as illustrated above in FIG. 17 (step 1908) with the process terminating thereafter. With reference again to step 1900, if a greedy state is not present, the process then determines whether the full frame is ready to be sent (step 1910). If a full frame is ready to be sent, process then proceeds to acquire the live (step 1906) and shift to the Waiting for Loop State (step 1908) with the process terminating thereafter. If a full frame is not ready to send, the state machine is held in the Idle State (step 1912) with the process terminating thereafter. FIG. 19 shows the process through a single pass in which the steps may be repeated while in the Idle State.

With reference to FIG. 20, a flowchart of a process incorporating rules used in the Waiting for Loop State is illustrated in accordance with a preferred embodiment of the present invention. This process is employed when the node has been opened by another node for a data transfer. The process attempts to acquire the loop (step 2000) while opportunistically sending data to the remote node opening the node in which this process is executed (step 2002). A determination is made as to whether the loop has been acquired (step 2004). If the node has not been acquired, the process returns to step 2000. Upon acquiring the loop, the process will terminate including the parallel process of sending data in step 2002. Also, the process will determine whether additional data is present to send to the remote node (step 2006). If data is still available, the process returns to step 2002. If no additional data is present to be sent, the process will also terminate, including termination of the attempts to acquire the loop in step 2000. This process determines whether the node has been opened by another node for a data transfer in which this remote node is the destination node for which data is destined to be transferred when the loop is acquired (step 2000). If the node has been opened by another node, which is also the destination node, data is sent opportunistically to this remote node. Then, a determination is made as to whether more data is present to be sent (step 2004). It more data is to be sent, then the state machine acquires the loop (step 2006) with the process terminating thereafter. With reference again to step 2004, if more data is not to be sent, the state machine is then shifted to the Waiting for Close State (step 2008) with the process terminating thereafter. With reference again step 2000, if the node has not in opened by a remote, the process then proceeds to acquire the loop in step 2006. Although these steps are shown serially, the process actually occurs as two parallel processes. While continuously to require the loop, data is sent opportunistically if possible. These processes continue in parallel until all of the data is sent or until the loop is required.

Next in FIG. 21, a flowchart of a process incorporating rules used in handling transitions in the Decision Window State is shown in accordance with a preferred embodiment of the present invention. The process begins by determining whether the request for the loop has been made by another node (step 2100). If the loop has not in requested by another node, a determination is made as to whether data cannot be transmitted because of a lack of credit and data is not being received (step 2102). If such a condition is not present, the timer for tracking the amount of time the loop has been held is reset (step 2104) with the process terminating thereafter. With reference into step 2102, if no data has been transmitted or received, the process and then determines whether the time the loop has been held is greater than a selected period of time (step 2106). This selected period of time may be programmable depending on the implementation. It the time the loop has been held his greater than the selected period of time, the state machine shifts into the Waiting to Close State (step 2108) with the process terminating thereafter. Otherwise, a process also terminates. With reference again to step 2100, and a request for the loop has been made by another node, the process also proceeds to step 2106 as described above.

Figure 22:
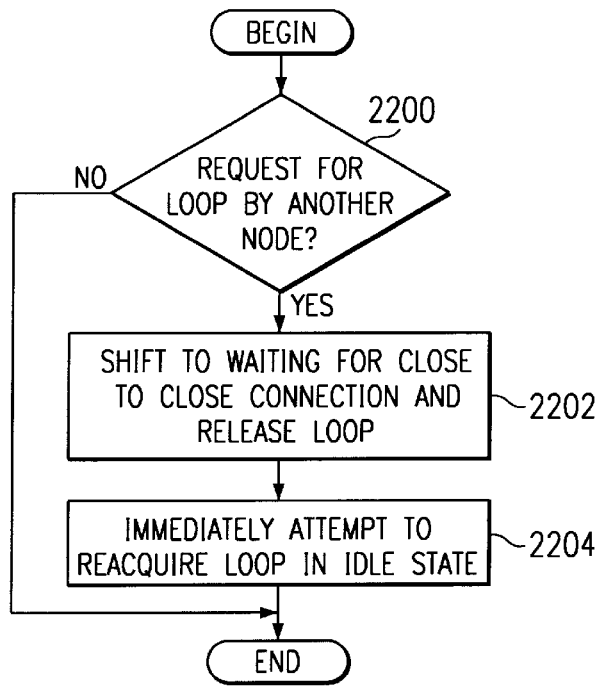
FIG. 22 is flowchart of a process incorporating rules for handling transitions in Decision Window State in accordance with a preferred embodiment of the present invention.

With reference now to FIG. 22, flowchart of a process incorporating rules for handling transitions in Decision Window State is depicted in accordance with a preferred embodiment of the present invention. This process is executed if the node is in a fair state. In other words, the node is always trying to allow the other nodes to access the loop whenever the other nodes request the loop. The process begins by determining whether the loop has been requested to. Otherwise, the state machine shifted to the Waiting for Close State from the Decision Window State to close the connection and release the loop (step 2202). Thereafter, the state machine is prompted to immediately attempt to require the loop in the Idle State (step 2204) with the process terminating thereafter.

Figure 23:
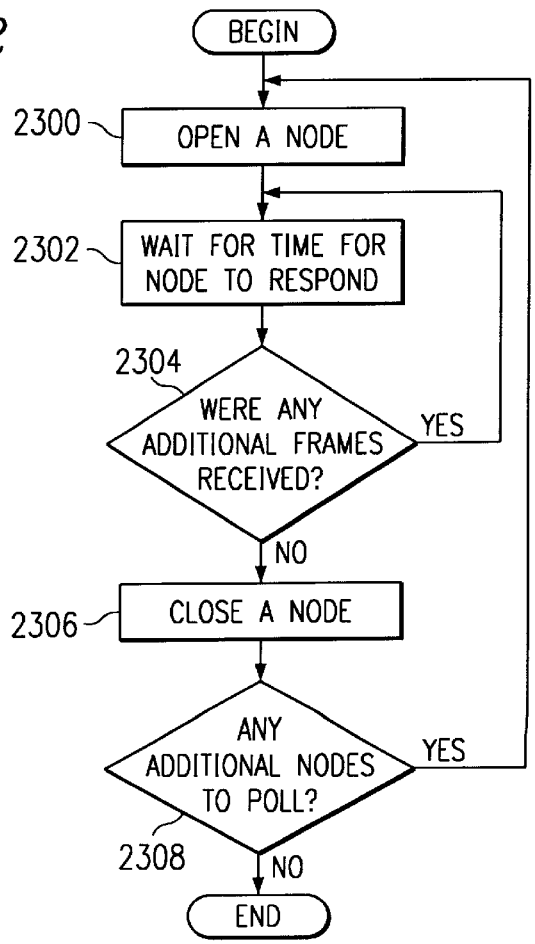

With reference now to FIG. 23, a flowchart of the process implementing rules for use in handling transitions from the Decision Window State is depicted in accordance with a preferred embodiment of the present invention. The process is used to poll nodes on the loop. The process begins by opening a node (step 2300). The process then waits for a period of time for the node to respond (step 2302). A determination is then made as to whether any additional frames have been received (step 2304). If additional frames have been received, the process then returns to step 2302. Otherwise, the node is then closed (step 2306). A determination is then made as to whether additional nodes are present for polling (step 2308). If additional nodes are present, the process then returns to step 2300 to poll another node. Otherwise, the process terminates.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

What is claimed:

1. A chip comprising:

an input port;

an output port;

a first processing unit, wherein the first processing unit includes:

first reception means for receiving request from a host located off the chip to transmit data to a destination;

storage means for storing the destination and the data in a memory connected to the chip prior to transmission to the destination;

generation means for generating a list of data transfers for data stored in the memory, wherein the list includes and identification of the data and a destination for the data; and a second processing unit, wherein the second processing unit includes:

detection means for detecting a presence of data for transmission to a destination using the list o data transfers generated by the generation means to detect a presence of data for transmission; and formatting means for formatting the data into a format for transport to the destination using the data and the destination.

2. The chip of claim 1, wherein a list of expected data is generated by the first processing unit and wherein the second processing unit includes:

reception means for receiving data from a remote source;

identification means for storing the data; and indication means for indicating to the first processing unit when all data has been received from the remote source.

3. The chip architecture of claim 1, wherein the second processing unit is an embedded processor.

4. The chip architecture of claim 1, wherein the second processing unit is a state machine.

5. The chip of claim 1, wherein the second reception means comprises:

transfer means for transferring data from a host memory to a memory coupled to the chip.

6. The chip of claim 1, wherein the input port is configured for communication with a bus on a host system, while the output port is configure for communication with the destination.

7. A chip comprising:

a bus interface unit, wherein the bus interface unit sends and receives data from a bus on the host;

a protocol engine connected to the bus interface unit, wherein the protocol engine manages transfer of information from a host memory coupled to the bus to a local memory coupled to the chip and generates a list of transmit activities used to transmit data to a device;

a link controller, wherein the link controller provides an interface for a communications link to the device;

a transmitter connected to the link controller, wherein the transmitter manages formatting data in to a format for transfer to the device by the link controller;

a receiver connected to the link controller, wherein the receiver managers data received by the link controller; and a context manager coupled to the protocol engine, wherein the context manager traverses the list of transmit activities and executes a transfer of data based on the list using the transmitter and wherein the context manager processes data received by the receiver.

8. The chip of claim 7, wherein the protocol engine is an embedded processor.

9. The chip of claim 8, wherein the context manager is an embedded processor.

10. The chip of claim 8, wherein the context manager is a state machine.

11. The chip of claim 7, wherein the data is a form of frames and wherein the context manager processes frames received from different sources arriving out of order.

12. The chip of claim 7, wherein the context manager traverses the list of transmit activities and executes a transfer of data by reading a first item from the list of transmit activities, determines whether the data for the item is local data, writes the data from the local memory to the transmitter in response to a determination that the data is local.

13. The chip of claim 12, wherein the context manager loads data, across the bus, from the host memory into the transmitter in response to a determination that the data for the item is system data.

14. The chip of claim 13, wherein the transmitter includes storage for storing data and context information and a framer connected to the storage.

15. The chip of claim 12, wherein the list of transmit activities is a plurality of transmit control blocks.

16. A chip comprising:

a bus interface unit, wherein the bus interface unit provides an interface to send and receive data from a first bus on the host;

a protocol engine connected to the bus interface unit, wherein the protocol engine manages transfer of information from a host memory to a memory coupled to the chip and responsive to a request to transfer data, wherein the protocol engine has a plurality of modes of operation comprising:

a first mode of operation in which the protocol engine detects a request to transfer block of data located in a host memory; and a second mode of operation, responsive to detecting the request, in which the protocol engine moves the block of data from the host memory into a local memory and creates a transmit block, wherein the transmit block includes the block of data and information used to transmit the block of data;

a transfer engine, wherein the transfer engine detects the transmit block and sends the transmit block to a transmitter;

the transmitter receives the transmit block and places block of data into a format for transmission, wherein the format is identified from the information; and a link controller connected to the transmitter, wherein the link controller provides an interface for a communications link to the device.

17. The chip of claim 16, wherein the context information includes an identification of a path to a destination.

18. The chip of claim 16, wherein the link controller is configured for communication with a Fibre channel arbitrated loop.

* * * * *